US012319021B2

(12) United States Patent
Schmidt et al.

(10) Patent No.: US 12,319,021 B2
(45) Date of Patent: Jun. 3, 2025

(54) METHOD FOR PRODUCING PRESSED PRODUCTS AND ASSEMBLY FOR PRODUCING PRESSED PRODUCTS

(71) Applicant: TU Bergakademie Freiberg, Freiberg (DE)

(72) Inventors: Andre Schmidt, Leipzig (DE); Franz Fehse, Freiberg (DE); Hans-Werner Schröder, Freiberg (DE); Felix Stöhr, Leipzig (DE); Gerd Kohlhase, Ahrensfelde (DE); Thomas Schmidt, Basel (CH)

(73) Assignee: TU Bergakademie Freiberg, Freiberg (DE)

( * ) Notice: Subject to any disclaimer, the term of this patent is extended or adjusted under 35 U.S.C. 154(b) by 858 days.

(21) Appl. No.: 17/253,638

(22) PCT Filed: Jun. 13, 2019

(86) PCT No.: PCT/DE2019/100547
§ 371 (c)(1),
(2) Date: Dec. 18, 2020

(87) PCT Pub. No.: WO2020/001689
PCT Pub. Date: Jan. 2, 2020

(65) Prior Publication Data

US 2021/0252819 A1 Aug. 19, 2021

(30) Foreign Application Priority Data

Jun. 29, 2018 (DE) ......................... 102018115881.5
Aug. 22, 2018 (DE) ......................... 102018120529.5

(51) Int. Cl.
*B30B 11/02* (2006.01)
*B30B 11/00* (2006.01)
*B30B 11/10* (2006.01)

(52) U.S. Cl.
CPC .......... *B30B 11/025* (2013.01); *B30B 11/005* (2013.01); *B30B 11/10* (2013.01)

(58) Field of Classification Search
CPC ...... B30B 11/025; B30B 11/005; B30B 11/10
See application file for complete search history.

(56) References Cited

U.S. PATENT DOCUMENTS 2,904,835 A 9/1959 Thomas
3,980,014 A 9/1976 McEwen et al.
(Continued)

FOREIGN PATENT DOCUMENTS

DE 3320667 A1 12/1984
DE 3333766 A1 3/1985
(Continued)

OTHER PUBLICATIONS

Machine translation of Giannelli, DE 20201301003 U1, obtained Jul. 25, 2023. espacenet.com (Year: 2023).*

*Primary Examiner* — Michael M. Robinson
(74) *Attorney, Agent, or Firm* — Michael Soderman

(57) ABSTRACT

A method of manufacturing compacts and an arrangement for manufacturing compacts, in which the disadvantages of the state of the art are overcome and an efficient method and at the same time a simple construction and a simple implementation are achieved. This involves a method for manufacturing compacts, wherein after feeding the feedstock, pre-pressing into a pre-agglomerate using at least one pre-pressing punch or at least one stuffing screw and subsequently main pressing of the pre-agglomerate into a compact in at least one pressing die using at least one main pressing punch and subsequently ejection of the compact from the at least one pressing die are performed, pre-pressing, main pressing and ejection being performed in a mutually parallel working direction. This also involves an arrangement for
(Continued)

manufacturing compacts, wherein at least one pressing die is provided in die tool receptacle with a feed for feedstock.

17 Claims, 11 Drawing Sheets

(56) References Cited

U.S. PATENT DOCUMENTS

| | | | |
|---|---|---|---|
| 4,371,328 | A | 2/1983 | Giles |
| 4,397,231 | A | 8/1983 | Burgin |
| 2005/0238750 | A1 | 10/2005 | Brown |

FOREIGN PATENT DOCUMENTS

| | | | | |
|---|---|---|---|---|
| DE | 19526342 | A1 | 1/1997 | |
| DE | 102010012300 | A1 | 9/2011 | |
| DE | 102011116031 | A1 | 4/2013 | |
| DE | 102012010263 | A1 | 11/2013 | |
| DE | 202013010003 | U1 * | 4/2014 | ............ B28B 1/087 |
| EP | 0024003 | A2 | 2/1981 | |
| EP | 0684117 | A1 | 11/1995 | |
| EP | 0888873 | A1 | 1/1999 | |
| EP | 1568477 | A1 | 8/2005 | |
| FR | 2792570 | A1 | 10/2000 | |
| GB | 2338921 | A | 1/2000 | |
| WO | 0076757 | A1 | 12/2000 | |
| WO | 2007049992 | A1 | 5/2007 | |

* cited by examiner

METHOD FOR PRODUCING PRESSED PRODUCTS AND ASSEMBLY FOR PRODUCING PRESSED PRODUCTS

CROSS REFERENCE TO RELATED APPLICATIONS

This application is the U.S. national stage of International Application No. PCT/DE2019/100547, filed on 2019 Jun. 13. The international application claims the priority of DE 102018115881.5 filed on 2018 Jun. 29 and the priority of DE 102018120529.5 filed on 2018 Aug. 22; all applications are incorporated by reference herein in their entirety.

BACKGROUND

Method for manufacturing compacts and arrangement for manufacturing compacts, specifically for the processing of regrowing, fossil and mineral raw materials, as well as in the area of residual and waste materials.

Pressing methods and pressing arrangements are already known.

DE 33 33 766 A1 describes a briquetting press for briquetting non-uniform fine material, specifically chip-, fibre- or leaf-shaped plant material, into dimensionally stable briquettes, having a reception chamber into which the material is fed via a pre-compactor consisting of a piston that is movable within a cylinder and from which the pre-compacted material is pressed into a die tool by means of a pressing piston that is reciprocatingly movable vertically to the movement of the compaction piston, where the cross-section of the reception chamber and die tool is approximately rectangular seen in a direction of the pressing piston, so that the pre-compacting piston with its front face essentially forms a whole side wall of the reception chamber. In addition, a rotating disc with die cavities is disclosed.

DE 10 2010 012 300 A1 discloses a device for pre-pressing bulk material, having a pressing piston which presses the material into a die cavity of a die tool that is in a pressing position. The die tool brings the die cavity from the pressing position into an ejection position by a rotating movement. At this time, the pressed briquette is cooled by heat being released to the solid material of the die tool. To improve the discharge of the heat produced during the pressing process, it is proposed to arrange the cavity in a die tool made as a solid disc.

U.S. Pat. No. 3,980,014 discloses a briquetting press which produces briquettes by a pressing process using two pressing punches or press cylinders arranged opposite each other and working in opposite directions.

DE 10 2011 116 031 A1 discloses a sluiceless solids feeding system for pressurized gasification reactors, allowing continuous feeding of the solid fuel, specifically brown coal and other briquettable solid fuels and fuel mixtures, into a gasification reactor pressurized at up to 65 bar.

US 2005/0238750 A1 discloses a briquetting machine with a press having a rotating disc where the disc is rotated by means of a hydraulic cylinder and an eccentric disc. This drive is disadvantageous for an exact disc position at high travel speeds. During pre-pressing, the ejection cylinder is arranged directly opposite the pre-pressing cylinder. Due to the cylinder arrangement, parallel and simultaneous operation of pre- and main pressing and ejection is not possible.

EP 0 888 873 A1 discloses a briquetting press, in which the apparatus is fitted with two main pressing cylinders arranged opposite each other. This is a disadvantageous energetic solution because both cylinders must exert maximum pressing force.

GB 2 338 921 A discloses a briquetting press with a rotatable disc rotated by means of a hydraulic cylinder and an eccentric disc. It is particularly disadvantageous that the ejection cylinder is retracted into the disc and then, by pressure exerted on the movable attachment of this cylinder, both the ejection cylinder and the disc are moved.

U.S. Pat. No. 4,371,328 discloses a sequential pressing operation, in which a die is filled by means of a screw. Then, a lock enters between the screw and the die, serving as a counter-pressing plate during main pressing which is performed at the same circular position from the opposite side. Thus, simultaneity of pre- and main pressing as well as of ejection is not given, and throughput is greatly reduced. Pre-compaction is done only by means of a screw, not by means of a pre-pressing cylinder. Pre-compaction is performed against the stationary main pressing cylinder, not against a fixed disc. The disc is driven externally, not via a shaft on the disc rotation axis.

The die tools of a briquetting machine as disclosed in WO 00 76757 A1 are arranged as three cylinders in series or alignment, of which two pressing cylinders at the extreme ends of the machine exert the respective acting main pressing force. Thus, the pre- and main pressing processes do not occur simultaneously against a rigid plate, but always against another cylinder. Before main pressing, pre-compaction occurs vertically or transversally to the main pressing direction so that the individual pressing steps are not parallel, but sequential. This has a negative impact on the achievable throughout. The synchronous cylinder in the machine centre is not used for exerting the pressing force for main pressing.

The pressing disclosed in EP 0 024 003 in the method of manufacturing single-layer compacts is performed against a movable punch moving together with the disc below the pressing sleeve, which punch is moved for filling and ejecting. Die filling is not performed at a standstill (stationary disc); the material trickles into the sleeve while the disc is moving and is stripped off at the end. Thus, the material is not pre-pressed.

In the pressing performed in a briquetting press as disclosed in DE 33 33 766 A1, the material is pre-compacted vertically or transversally to the main pressing direction, with the compacted material being subsequently fed from a main pressing cylinder into a die sleeve, and there the pressing pressure required for briquetting is built up. That is, this is a sequential method where pre- and main pressing as well as ejection cannot occur at the same time. This has a negative effect on the machine speed and thus also a negative effect on throughput.—The pre-compacted material must be pushed completely from the main cylinder as far as into the die. This has a negative effect on electrical power demand.

SUMMARY

The object of the invention is to create a method of manufacturing compacts and an arrangement for manufacturing compacts, in which the disadvantages of the state of the art are overcome and an efficient method and at the same time a simple construction and a simple implementation are achieved. This involves: A method for manufacturing compacts, wherein after feeding feedstock a volume reduction of the feedstock (11) is performed and subsequently main pressing of the feedstock into a compact and ejection of the compact are performed, characterized in that after feeding the feedstock (11), pre-pressing into a pre-agglomerate (12) using at least one pre-pressing punch (1) or at least one stuffing screw (17) and subsequently main pressing of the pre-agglomerate (12) into a compact in at least one pressing die (3) using at least one main pressing punch (21) and subsequently ejection of the compact from the at least one pressing die (3) are performed, pre-pressing, main pressing and ejection being performed in a mutually parallel working direction.

And:

An arrangement for manufacturing compacts, wherein at least one pressing die (3) is provided in die tool receptacle (2) with a feed (10) for feedstock (11) and wherein the at least one pressing die (3) is able to be arranged or moved correspondingly to at least one pre-pressing punch (1) or at least one stuffing screw (17) and to at least one main pressing punch (21), the working direction of the at least one pre-pressing punch (1) or of the at least one stuffing screw (17) and of the at least one main pressing punch (21) being mutually parallel, wherein a counter-pressing plate (4) is on the side of the respective pressing die (3) or die tool receptacle (2) opposite and/or facing the at least one pre-pressing punch (1) and a counter-pressing plate (4) and/or a shaping channel (30) with a region of a constriction (31) is on the side of the respective pressing die (3) opposite the at least one main pressing punch (21), the at least one pressing die (3) being continuous in the working direction.

DETAILED DESCRIPTION

The invention is based on the object to develop a material feed device without elaborate suction devices, where an extrusion press feeds the coal continuously and without a sluice into a pressurized gasification reactor. The briquette string that is firmly braced in the shaping channel of the extrusion press forms an almost gas-tight briquette plug, sealing the pressurized reactor against the feed system. For this purpose, the pressing tool is provided with a rigid shaping channel, has cooling ducts around the whole pressing space and the shaping channel consists of wear sleeves with a regular geometry on all sides and is subdivided into a pressing region, a constriction region and a flare region.

The state of the art shows that in each case there is only a volume reduction before the actual pressing process or an immediate pressing process for the feedstock, with the cylinder and punch path being disadvantageously very long or two punches or cylinders running in opposite directions being used. It has been shown that a single cylinder or punch must extend very far to be able to fulfil the whole pressing task. Experiments have shown that cylinder or punch paths that vary significantly depending on the feedstock, for example more than 70% of the cylinder or punch path, would only cause the air-filled void volume of the bulk material to be displaced before the cylinder or punch starts building up a pressing pressure. This single cylinder would have a large diameter to be able to build up the full pressing pressure. Thus, a large amount of oil would have to be fed into the cylinder. This implementation has proved to be highly inefficient.

Therefore, the object of the invention is to create a method of manufacturing compacts and an arrangement for manufacturing compacts, in which the disadvantages of the state of the art are overcome and an efficient method and at the same time a simple construction and a simple implementation are achieved.

In the application case mentioned, the invention achieves that a method for a pressing process for manufacturing compacts is created by means of a sequentially rotating die tool receptacle, where after feeding of the feedstock, pre-pressing into a pre-agglomerate using at least one pre-pressing punch or at least one stuffing screw and subsequently the main pressing of the pre-agglomerate into a compact in at least one pressing die using at least one main pressing punch and subsequently ejection of the compact from the at least one pressing die by means of at least one ejection punch are performed, pre-pressing, main pressing and ejection being performed simultaneously in a mutually parallel working direction at different fixed positions distributed in the circumferential direction and on one side at the respective position and the die tool receptacle being at a standstill for this purpose. Only after each pressing process or ejection is the die tool receptacle moved on for a new or subsequent pressing process or ejection. The pressing processes and the respective ejection are performed at the respective position depending on the construction of the arrangement in parallel as well as in the same or different pressing directions or ejection directions, but only from one side, thus acting only from one side onto the pressing die or on the feedstock during pre-pressing, the pre-agglomerate during main pressing as well as on the compact during ejection. The pressing dies are provided in at least one die tool receptacle.

Accordingly, the invention further includes an arrangement for manufacturing compacts, where at least one pressing die with a feed for the feedstock is provided in at least one sequentially rotating die tool receptacle, in which at least one pressing die can be arranged correspondingly relative to at least one pre-pressing punch or at least one stuffing screw and to at least one main pressing punch and to at least one ejection punch. For this purpose, the respective pressing die is able to be moved to the least one pre-pressing punch or the at least one stuffing screw, the at least one main pressing punch and the at least one ejection punch. Furthermore, the working direction of the at least one pre-pressing punch or the at least one stuffing screw, the at least one main pressing punch and the at least one ejection punch is mutually parallel, with a counter-pressing plate arranged on the side of the pressing die opposite and/or facing the pre-pressing punch and a counter-pressing plate arranged on the side opposite the at least one main pressing punch and a shaping channel with a constriction region or a device or arrangement for the collection, discharge or further processing of the compacts present on the side of the pressing die opposite the at least one ejection punch, where the at least one pressing die is continuous in the working direction, and thus the pressing or ejection processes of the compacts performed in the respective unilateral, parallel, same or different pressing directions or ejections directions can be performed.

The respective positions into or to which the pressing die is moved for pre-pressing, main pressing and ejection can be designated correspondingly as pre-pressing position, main pressing position and ejection position.

The respective counter-pressing plate is connected to the drives of at least the pre-pressing punch and the main pressing punch in a force-absorbing and thus force-balancing manner so that only small axial forces or no forces acting in the working direction of the respective pressing process occur at or are introduced into the die tool component containing the pressing die and its constructive implementation. The pressing dies move relative to and towards the respective counter-pressing plates or to the at least one pre-pressing punch, the at least one stuffing screw, the at least one main pressing punch and the at least one ejection punch, respectively.

Advantageously, the method according to the invention as well as the arrangement divide the pressing process into at least two parts by means of a hydraulic cylinder of a small diameter pre-pressing the bulk material into a pre-agglomerate, which causes the volume to be reduced significantly further than by pre-compaction that also causes a volume reduction, the hydraulic cylinder being able to extend very fast for pre-pressing, for example. The pre-agglomerate already has a more solidified structure than with pre-compaction, which is neither reached nor wanted in a pre-compaction process. In pre-compaction, a loose structure of the feedstock is preserved. Here, pressures of a fraction of the actual main pressing process are used. It is only subsequently that a hydraulic cylinder of a large diameter is used in the high-pressure range, which then must travel only a small path. Thus, the necessary oil volume flow can be drastically reduced, resulting in greatly reduced power demand.

During the first pressing as pre-pressing, a large relative movement of the pre-pressing punch as well as between the feedstock and the surface of the die tool occurs, with pre-pressing being performed only at a small pressure. During the second pressing as main pressing, high pressure is built up, but the path travelled by the main pressing punch is only a few millimetres.

Drives to be considered for the respective pre-pressing punches or the main pressing punches or the ejection punches are, for example, hydraulic cylinders, pneumatic cylinders or linear motors as well as other drives acting in a comparable manner.

If the stuffing screw is used as a pre-pressing screw, no clearly definable pre-agglomerates can be formed due to the continuous feeding and pre-pressing of the feedstock. Nonetheless, a pre-pressing pressure is reached in the pressing die, forming positionally stable pre-agglomerates. For example, the stuffing screw is used with appropriate materials where shearing leads to no or to acceptable shear patterns at the pre-agglomerate boundary surfaces formed.

Volume reduction is understood as pre-compaction of the feedstock, the volume reduction being performed only under very small pressure and the feedstock still being present in a loose or unconsolidated or instable form. On the other hand, pre-pressing as compared with volume reduction is performed under increased pressure, which in addition to a volume reduction causes the feedstock to be pre-pressed into a positionally stable pre-agglomerate which remains in the pressing die in a self-locking manner and intrinsically stable and positionally stable, thus performing a compaction in addition to the volume reduction, with the final strength not being reached yet.

Only the main pressing, i.e., the pressing with a very high pressure, achieves a highly compacted, dimensionally stable and shape-retaining compact.

The method and arrangement are suitable for manufacturing compacts of high strength and dimensional stability of various shapes and sizes from the most diverse feedstocks. These can be subdivided into the following exemplary groups:

- Regrowing raw materials
- Fossil raw materials
- Mineral raw materials
- Residual and waste materials In particular, these may be for example:

- Any wood and bark
- Agriculturally produced biomass, crop residues and by-products of food and feedstuff production such as straw, e.g., wheat straw, rapeseed straw, oat straw, rice straw; grasses, e.g., miscanthus, reed canary grass; bagasse; husks; hay; fruit waste; peels
- Dried fermentation residues
- Peat, coals of different ages and ranks of coal such as soft brown coal, hard brown coal, hard coal, anthracite coal
- Limestone, quicklime, fertilizer, potash salt, dolomite, bentonite
- Sewage sludges, household waste, plastic waste, metal chips, metal curls, sponge iron, metallurgical residual materials, graphite as well as
- Multi-material mixtures of these components The compacts can be manufactured without binders as well as using the most diverse natural or synthetic binders such as starch, tar, pitch and/or molasses.

The term compact comprises briquettes and other designations of pressed raw materials alike.

The method of pre-pressing, main pressing and ejection is continuous and repetitive. After a compact is ejected from a pressing die, this is followed by another pre-pressing and main pressing in the respective free pressing die, and then another ejection. If a plurality of pressing dies is used, it is not excluded that the pressing die is only moved between the individual pressing steps in order to arrive at the respective subsequent pressing step or ejection. Empty movements of the pressing die or movements of the pressing die with a pre-agglomerate or movements of the pressing die with a compact are not excluded.

The pressing dies may have any shapes, cross-sections and depths.

Advantageous embodiments of the method as well as of the arrangement are presented in the dependent claims.

Advantageously, the ejection is performed by means of at least one ejection punch since comparably longer paths are travelled for ejection than during main pressing. However, it is nonetheless or also provided that the ejection is performed by means of the at least one main pressing punch since its drive is already designed for large forces. This main pressing punch and its drive would then have to travel longer paths than necessary for main pressing.

Advantageously, a shaping channel with a region of a constriction or a device for discharge or further processing, the device thus being usable for different applications, is provided on the side of the respective pressing die opposite the at least one ejection punch. Besides the manufacture of individually dropping compacts and output in fixed receptacles, use is also possible, for example, on a continuously operating sluiceless solids feeding system for pressurized reactors and containers. By means of the constriction, gas tightness known per se is achieved. The drive of the ejection punch would then have to be designed according to the necessary forces.

Alternatively to the shaping channel, an arrangement or device for the collection, discharge or further processing of compacts is provided. This is understood as including all actions and steps performed on the compacts that follow the manufacturing process of compacts. These may include but are not limited to conveying devices or collecting devices.

In addition or alternative to the shaping channel with a constriction region on the side of the pressing die opposite the at least one ejection punch, a support plate is provided, which support plate absorbs any forces that may occur during ejection and in return comprises an opening corresponding to the shape or cross-section of the compact to allow ejection of the compact.

A further development of the method is that pre-pressing, main pressing and/or ejection are performed independently of each other in a same or opposite working direction, whereby the individual steps, depending on the requirements of the method, can proceed accordingly in a same direction or in opposite directions as well as parallel at the same time or sequentially one after the other.

By the at least one pre-pressing punch or the at least one stuffing screw, the at least one main pressing punch and/or the at least one ejection punch having the same or an opposite working direction, it is achieved that the forces acting on the pressing die are co-directional. Moreover, the arrangement of the punches can be simplified. Simultaneous pressing processes and the ejection process are facilitated. Furthermore, downstream processes can be operated efficiently.

The respective pressing processes and the ejection process can performed individually for the respective pressing die by the at least one pressing die being moved sequentially to the at least one pre-pressing punch or the at least one stuffing screw and to the at least one main pressing punch or by the at least one pressing die being moved sequentially to the at least one pre-pressing punch or the at least one stuffing screw, to the at least one main pressing punch and to the at least one ejection punch. Moreover, this achieves that only relatively small masses are moved and the components absorbing the forces do not have to be moved actively. This respective process occurs in a revolving or repetitive manner so that the pressing die is moved accordingly to the pre-pressing punch after the main pressing punch or the ejection punch.

By performing one, two or more pre-pressings, main pressings and/or ejections in parallel or at the same time, throughput is increased and thus the manufacturing process is more efficient. Pre- and main pressing as well as ejection of the compact may thus run at the same time. So far, these have been sequential steps building on one another in other state-of-the-art hydraulic presses. Despite the increased throughput of the machine, neither the hydraulic cylinder nor the hydraulic unit are significantly enlarged.

Advantageously, the feedstock is pre-compacted for pre-pressing and/or it is pre-pressed into at least pre-pressed feedstock or a pre-agglomerate in the pressing die and/or in a pre-pressing channel so that, on the one hand, pre-compacting for pre-pressing, which requires paths of different lengths depending on the feedstock, and, on the other hand, a series of pre-pressing processes may occur sequentially in the pre-pressing channel as a multi-pressing process, which are successively kept waiting in the pre-pressing channel and are then successively pushed into the respective pressing die for final pre-pressing and are thereby given their shape and strength. It is favourable that several pre-pressing processes are performed in the corresponding phases of process-related intervals of the method. The series of pre-pressing processes as multiple pressing achieves an additional volume reduction of the pre-agglomerates.

Having two or more successive pre-pressing processes in which the respective feedstock is pressed against the respective preceding pre-agglomerate increases pre-pressing throughput.

Pre-pressing by means of a pre-pressing punch is also performed already in the pre-pressing channel in addition to pre-pressing in the pressing die.

By pushing the pre-agglomerate one position further in case of two or more pre-pressing processes, with one pre-agglomerate being pushed into the pressing die each time, the respective preceding pre-agglomerate is also pressed in the pressing die. Thus, reliable pre-pressing is additionally facilitated.

In case of two or more successive main pressing processes or ejections, the compacts are pushed out of the pressing die or from the pressing die into a shaping channel with a constriction region, the respective compacts being pushed one position further into the shaping channel, whereby a snugly abutting stack or snugly abutting series of compacts is achieved, which facilitates the subsequent process, e.g., by maintaining a process pressure due to tightness.

Advantageously, the pre-agglomerate is pre-pressed into a positionally stable shape so that it does not fall out of the pressing die or is not loose and does not trickle out of the pressing die. By pre-pressing or the positionally stable shape, smooth or definable surfaces are obtained as boundary surfaces or as contact surfaces of each pair of pre-agglomerates, allowing clean separation or shear without impairing the shape of the pre-agglomerate. Thus, the individual pre-agglomerates pre-pressed in the pre-pressing channel are advantageously able to be pushed into the pressing die and to be processed further there.

Specifically, when using feedstock of increased elasticity or any present residual elasticity, expansion of the pre-agglomerate occurs after pre-pressing, with the result that the pre-agglomerate projects from the pressing die on at least one side and the movement of the pressing die to the main pressing punch is impeded or made impossible or that the pre-agglomerate is damaged and falls out. Accordingly, positioning is provided to correct the position of the pre-agglomerate in the pressing die. Furthermore, positioning achieves that, for pre-agglomerates which have been pre-pressed as a stack in the pre-pressing channel, the respective pre-agglomerate pressed into the pressing die can be pushed into the direction of the pre-pressing channel or the pre-pressing punch as far as to correspond to the contact surface between the pre-agglomerate in the pressing die and the pre-agglomerate in the pre-pressing channel with the plane or the plane or area of the transition between the pre-pressing channel and the pressing die so that there is no disadvantageous shearing off of the pre-agglomerate during the movement of the pressing die to the main pressing punch.

By having pre-compaction before pre-pressing, pre-compaction and specifically a volume reduction of the feedstock is additionally achieved, which facilitates the pre-pressing process and increases the reliability and accuracy of pre-pressing. Pre-compaction can be performed by means of a pre-compaction punch or stuffing screw as a pre-compaction screw as examples, but not limited to these.

In a further development of the method, the feedstock for pre-pressing is fed in a dynamically controlled manner, where the quantity of the fed feedstock is influenced by means of the at least one pre-pressing punch or by means of pre-compaction. Thereby, uniform pre-agglomerates or pre-agglomerates of a defined size can be achieved since the required feedstock quantity is adapted.

Advantageously, the feedstock quantity is adjusted based on the pre-pressing path to achieve uniform pre-agglomerates or pre-agglomerates of a defined size.

Advantageously, the at least one pre-pressing punch or the at least one stuffing screw and/or the at least one main pressing punch and/or the at least one ejection punch act simultaneously on the respective allocated pressing dies located at the respective position of the at least one pre-pressing punch or the at least one stuffing screw and/or the at least one main pressing punch and/or the at least one ejection punch, whereby a pre-pressing process in one pressing die, a main pressing process in another pressing die and an ejection in a third pressing die can be performed at the same time, achieving an efficient method and high throughput.

By performing the main pressing process alternately between at least two pressing dies of die tool receptacles spaced from each other, it is achieved that when the main pressing punch recedes by means of the main pressing cylinder after having pressed a compact, a new compact can be produced at the same time on the other side of the main pressing cylinder by a second main pressing punch arranged on it. This prevents that, after the pressing task, the main pressing cylinder recedes in an idle stroke during which no work is done.

Advantageously, the die tool receptacle is, for example, a round or polygonal die tool disc or die tool ring rotatable around the rotation axis, with at least one pressing die being arranged in at least one round or polygonal die tool disc or die tool ring around a rotation axis, whereby a uniform movement of the pressing die to the respective pressing punches is facilitated because the whole process of at least pre-pressing, main pressing and ejection is continuous and repetitive and thus a reciprocating movement of the respective empty pressing die is avoided. Using a ring instead of a disc results in a simplified design of the die tool and smaller masses to be moved.

Advantageously, with two or more pressing dies, the pressing dies in the die tool receptacle, as a rotatable round or polygonal die tool disc or die tool ring, are distributed in circumferential direction or each offset by 120 degrees or by 60 degrees or by 30 degrees on the die tool disc or die tool ring, whereby the respective pressing dies can be operated equally and without impeding each other. Furthermore, pressing die arrangements with each die offset by 180 degrees or by 90 degrees or by 45 degrees are also considered.

In addition to a disc and ring, the at least one pressing die is advantageously arranged in at least one radially arranged die tool arm as die tool receptacle extending from the rotation axis and rotatable around the rotation axis. In case of two or more radially arranged die tools arms as die tool receptacles extending from the rotation axis and rotatable around the rotation axis, the die tool arms are distributed around the rotation axis or offset by 120 degrees or by 60 degrees or by 30 degrees. This achieves a simple and material-saving implementation which can also be used to operate the respective pressing dies equally and without impeding each other. In addition, die tool arms offset by 180 degrees or by 90 degrees or by 45 degrees and distributed in a circumferential direction are also considered.

The distribution of the pressing dies in the respective die tool receptacle in circumferential direction or distribution of the die tool arms can be evenly arranged in an ordered manner or be unordered or irregular. This is imposed by the respective process and/or constructive design.

For example, if no separate ejection punch is used, the pressing dies or die tool arms can be arranged to be offset by 180 degrees or by 90 degrees or by 45 degrees since pre-pressing is followed by main pressing including ejection.

Any other angle specifications or increments are included and are a result of the respective constructive implementation and requirements.

Further or other shapes and cross-sections of the die tool receptacle are possible if the respective design of the die tool receptacle allows the respective pre-pressing, main pressing and ejection. Alongside ellipsoids, for example, irregular forms with or without corners are also considered. Although die tool receptacle relates to the die tool disc, the die tool ring or the at least one die tool arm, other equally suitable shapes and cross-sections of the die tool receptacle are included.

The at least one die tool receptacle, for example as a die tool disc, as a die tool ring or as an at least one die tool arm, can be arranged vertically, with the rotation axis being aligned horizontally, or horizontally, with the rotation axis being accordingly aligned vertically. Accordingly, in a vertical arrangement of the at least one die tool receptacle, for example as a die tool disc, as a die tool ring or as at least one die tool arm, the respective punches are arranged horizontally, and in a horizontal arrangement of the at least one die tool receptacle, as a die tool disc, as a die tool ring or as at least one die tool arm, the respective punches are arranged vertically.

A further development of the arrangement provides that the at least one die tool receptacle, for example as a die tool disc, as a die tool ring or as at least one die tool arm, rotates sequentially around the rotation axis so that the respective pressing die in the at least one die tool receptacle, for example as a die tool disc, as a die tool ring or as at least one die tool arm, stands still opposite and relative to the respective punch for the respective pressing step or for ejection. Advantageously, low-wear servo motors are used, which act on the rotation axis and thus on the rotation shaft, influencing the movement. Nonetheless, other equally suitable drives are not excluded.

Depending on design and necessity, the respective counter-pressing plate is arranged to be stationary on the side of the respective pressing die opposite the respective pre-pressing punch.

On the other hand, the respective counter-pressing plate is arranged to be pivotable or movable if it is arranged on the side of the respective pressing die facing the at least one pre-pressing punch to ensure that it unblocks the respective pressing die after pre-pressing in the shaping channel or in the filling channel and the pre-agglomerate can be pushed into the pressing die. This makes it possible to pre-press and keep waiting a series of pre-agglomerates irrespective of the position of the pressing dies. These can then be pushed fast and easily into the respective pressing die and be distributed over the pressing dies. Pre-pressing and also the whole pressing process can thus be optimized.

To obtain further flexibility, counter-pressing plates are provided on both sides of the pressing die, i.e., on the side opposite and on the side facing the respective pressing punch, with the counter-pressing plate provided on the side of the respective pressing die facing the at least one pre-pressing punch being pivotable or movable. Thus, depending on necessity, pre-agglomerates can be pre-pressed independently of the pressing die, on the one hand, and the pressing die can be used for pre-pressing, on the other hand.

Furthermore, the respective counter-pressing plate for main pressing is arranged to be pivotable or movable, specifically if arranged in combination with a shaping channel on the side opposite the respective pressing die to ensure that it unblocks the way into the shaping channel after main pressing in the respective pressing die and the compact can be pushed into or pushed further into the shaping channel.

If no shaping channel is provided on the side of the respective pressing die opposite the at least one main pressing punch, the respective counter-pressing plate on the side of the respective pressing die opposite the main pressing punch can be stationary. However, it may also be arranged to be pivotable or movable.

The counter-pressing plate arranged to be pivotable or movable is driven accordingly in order to be pivoted or moved from the position of the respective pressing process to an unblocking or open position. The respective drive is determined by the respective individual specific characteristics of the arrangement.

Preferably, locking in place of the pivotable or movable counter-pressing plate is provided to obtain a more reliable absorption and balancing of the forces in connection with the pre-pressing punch and the main pressing punch.

By arranging the at least one pre-pressing punch or the at least one stuffing screw, the at least one main pressing punch and the at least one ejection punch relative to the at least one die tool receptacle, for example as a die tool disc or as a die tool ring, to be distributed in the circumferential direction of the at least one die tool receptacle, for example as a die tool disc or as a die tool ring or as an arrangement of die tool arms, or offset by 120 degrees or repetitively by 60 degrees or 30 degrees, it is achieved that the respective pressing punch(es) and ejection punch(es) for the respective pressing step or ejection are distributed evenly and without impeding each other. The pressing punches can be arranged offset by 180 degrees or by 90 degrees or by 45 degrees.

Moreover, the distribution of the respective pressing punches in the circumferential direction of the respective die tool receptacle can be evenly arranged in an ordered manner or be unordered or irregular. This is imposed by the respective process and/or constructive design.

For example, if no separate ejection punch is used, the pressing punches can be arranged offset by 180 degrees or by 90 degrees or by 45 degrees.

Any other angle specifications or increments between 1 and 90 degrees as well as multiples of these angle specifications are included and are a result of the respective constructive implementation and requirements.

With two or more pressing dies, by allocating the at least one pre-pressing punch or the at least one stuffing screw, the at least one main pressing punch and the at least one ejection punch to one of the pressing dies, the pre-pressing process in one pressing die, the main pressing process in another pressing die and the ejection in yet another pressing die can be performed at the same time, whereby the efficiency of the arrangement is improved.

In a further development of the arrangement, one feedstock feed for the respective pressing die or a common feed for two or more pressing dies are provided, where in case of a common feedstock feed the respective pressing dies are arranged side by side in the region of the feedstock feed and/or of pre-pressing. Having the pressing dies that are fed with feedstock at the same time in one horizontal plane facilitates equal feeding of feedstock because different relative heights of the pressing dies or a skewed position of an elongated pressing die would lead to unequal filling or feeding, and thus the pre-agglomerates or the compacts would be non-uniform.

In a horizontal arrangement of the at least one die tool receptacle as a die tool disc, as a die tool ring or as at least one die tool arm, the respective pressing dies are in one horizontal plane formed by the at least one die tool receptacle, as a die tool disc, as a die tool ring or as at least one die tool arm. In this arrangement, the position within the plane formed is relevant for the allocation of the respective pressing or ejection punches.

In a vertical arrangement of the at least one die tool receptacle, for example as a die tool disc, as a die tool ring or as at least one die tool arm, the respective pressing dies lie side by side in one horizontal plane lie within the at least one die tool receptacle, for example as a die tool disc, as a die tool ring or as at least one die tool arm.

This arrangement undergoes a further development by providing two die tool receptacles, for example as die tool discs or as die tool rings. Likewise, two die tool receptacles can be provided as arrangements of at least one die tool arm. It is not excluded that the die tool receptacles, for example as a die tool disc or as a die tool ring or as an arrangement of die tool arms, are combined with each other for a dual arrangement so that a combination of a die tool ring and die tool disc or arrangement of die tool arms or a combination of a die tool disc and an arrangement of die tool arms is implemented. Since the die tool receptacles are designed as a die tool ring, as a die tool disc or as an arrangement of die tool arms, for example, these have a coincident rotation axis or different rotation axes. Likewise, the shapes and sizes of the die tool receptacles, for example as a die tool ring, as a die tool disc or as an arrangement of die tool arms can be the same or different.

The respective die tool receptacles, for example as die tool discs or as die tool rings or as arrangements of die tool arms, are spaced from each other. At least the respective one main pressing punch allocated to the at least one pressing die in the respective die tool receptacle, for example as a die tool disc or as a die tool ring or as arrangements of the die tool arms, is alternately drivable by a common main pressing cylinder or drive arranged between the die tool receptacles, for example as die tool discs or as die tool rings or as two arrangements of die tool arms. This allows operation of the main pressing cylinder as a synchronous cylinder. If the cylinder were operated as a hydraulic cylinder with a unilateral piston rod, the same oil volume as needed for extension would have to be conveyed into the cylinder during retraction. This idle stroke during which no work is done means additional expense of energy and thus has a negative impact on the plant efficiency. In addition to the main pressing cylinder, other suitable drives that cause an individually controlled linear movement of the main pressing punch with the required force are considered.

The whole construction of at least one pre-pressing punch or at least one stuffing screw as well as at least one ejection punch is provided once more on the other, opposite side of the main pressing cylinder.

If the system is designed as a single system for small throughputs, operation can be realized by means of a main pressing cylinder with a unilateral piston rod.

A pre-pressing channel that leads into each pressing die, with the at least one pre-pressing punch or the at least one stuffing screw being arranged in or leading into at least one pre-pressing channel, achieves that a series of agglomerates can be kept waiting to be pushed successively into the pressing die and that the agglomerate pushed into the pressing die and at least another one are pre-pressed. Thus, the pre-agglomerates are pre-pressed twice without increasing the pressure applied. Having a tapered portion of the pre-pressing channel in the working direction, i.e., in the direction of the pressing die, facilitates pre-pressing of the agglomerate. This tapered portion has the advantage that the pre-agglomerates are further compacted within the pre-pressing channel, which is advantageous for feedstock of low bulk density.

By a positioning punch in connection with the at least one pressing die, it is achieved that, on the one hand, pre-agglomerates can be pushed into a favourable central position within the pressing die and that, on the other hand, in case of incomplete or staggered filling of the pressing die and/or when the pre-pressure channel is used, the pre-agglomerates can be pushed back into a position corresponding to the contact surface between two pre-agglomerates or to the boundary surface of the pre-agglomerate and the surface plane of the die tool receptacle around the pressing die or to the plane between the pre-pressing channel and the pressing die, and thus no disadvantageous shearing off of the pre-agglomerate occurs. The positioning punch is provided in the counter-pressing plate or is part of it, for example.

In this arrangement, the working direction of the positioning punch is contrary to that of the pre-pressing punch.

Preferably, the positioning punch is arranged in alignment with the pre-pressing punch.

Advantageously, at least one pre-compactor is arranged in the pre-pressing channel or in the feed unit. Thus, specifically with large-volume feedstocks, it is possible to allow a volume reduction to an extent that the feeding of the feedstock and subsequently the pre-pressing process are facilitated. Feeding and pre-pressing of feedstock in installments until the desired pre-agglomerate size is reached for a compact would be disadvantageous because contact surfaces or boundary surfaces form on each of such assembled pre-agglomerates, which can result in weak points of the compact. As a pre-compactor, for example pre-compacting punches or a stuffing screw as a pre-compacting screw are used but not limited to these.

The pre-compactor being arranged at an angle smaller than 90 degrees to the working direction of the pre-pressing punch, i.e., in the direction of pre-pressing punch drive, facilitates the feeding of the pre-compacted feedstock since pre-compaction is thus also inclined or directed in the working direction of the pre-pressing process and not opposite to it. Likewise, pre-compaction may also be provided transversally to the working direction of pre-pressing.

BRIEF DESCRIPTION OF THE DRAWINGS

Several exemplary embodiments of the invention are illustrated in the drawings and are described in detail in the following. Of the drawings.

DETAILED DESCRIPTION OF THE PREFERRED EMBODIMENTS

Figure 1:
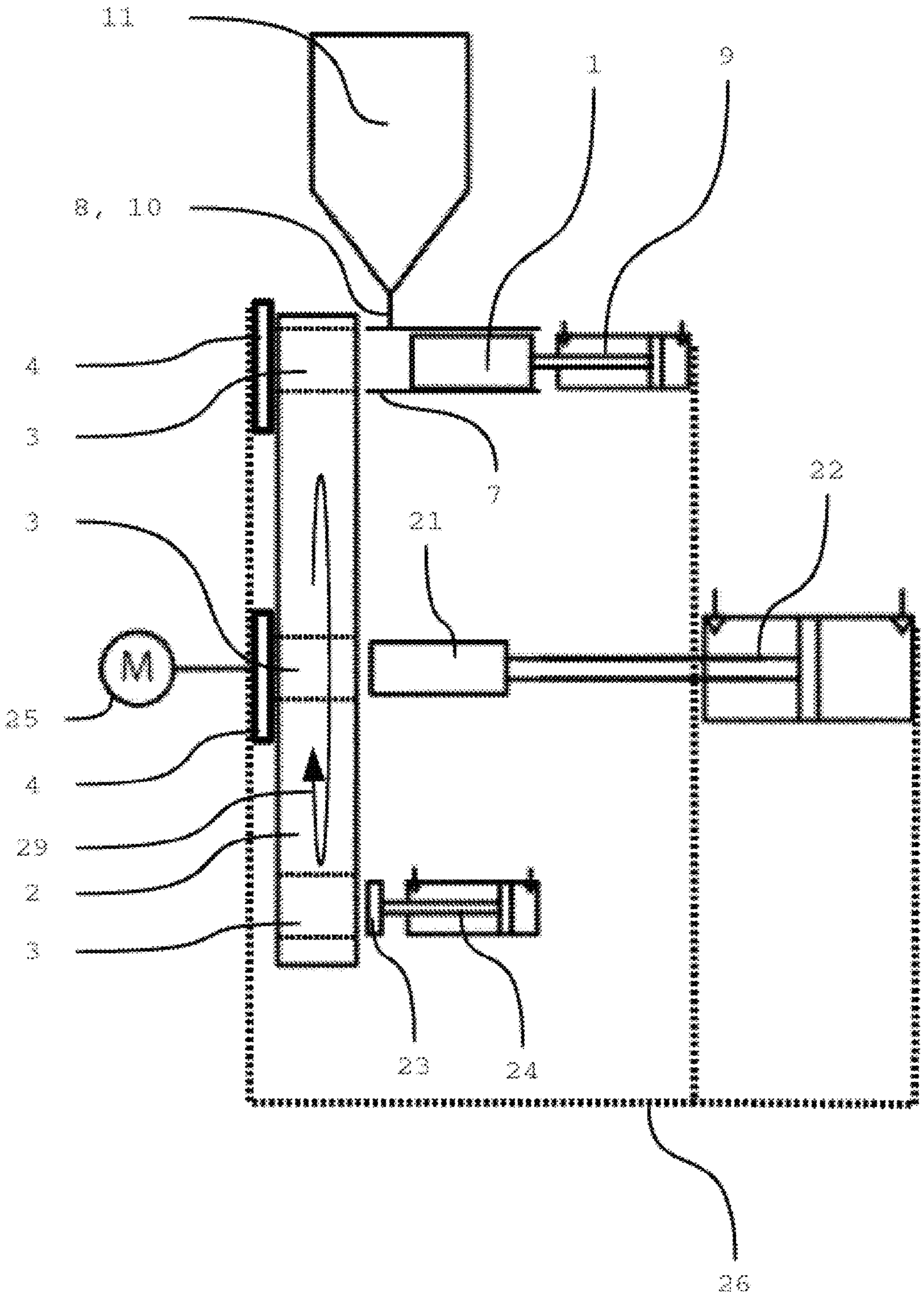
FIG. 1 shows a schematic illustration of an arrangement for a pressing process with a feedstock feed, a pre-pressing punch with a pre-pressing cylinder, a main pressing punch with a main pressing cylinder and an ejection punch with an ejection cylinder at a driveable, rotatable die tool disc with pressing dies arranged therein and a schematic illustration of a force-absorbing connection between the counter-pressing plates and the cylinders of the pre-pressing punch and of the main pressing punch, where the pre-pressing punch with the pre-pressing cylinder, the main pressing punch with the main pressing cylinder and the ejection punch with the ejection cylinder are arranged to be parallel and to have the same working direction.

The method according to the invention proposes an at least two-step pressing process in a die tool with the following sequence, where feedstock 11 is fed and after feeding the feedstock 11, pre-pressing into a pre-agglomerate 12 in at least one pressing die 3 is performed. This also causes a volume reduction of the feedstock 11. Depending on the feedstock 11 and on process design, pre-pressing is performed with at least one pre-pressing punch 1 or with at least one stuffing screw 17. Subsequently, main pressing of the pre-agglomerate 12 into a compact is performed in the at least one pressing die 3 with at least one main pressing punch 21. After main pressing, ejection of the compact from the at least one pressing die 3 is performed. Pre-pressing, main pressing and ejection are performed in a mutually parallel working direction.

In a specific exemplary embodiment, pre-pressing and main pressing are performed at the same time and in the same direction. Besides pre-pressing and main pressing being performed at the same time and in the same direction, opposite or co-directional pressing directions independently of each other and/or simultaneous or sequential pressing processes are provided.

Figure 2:
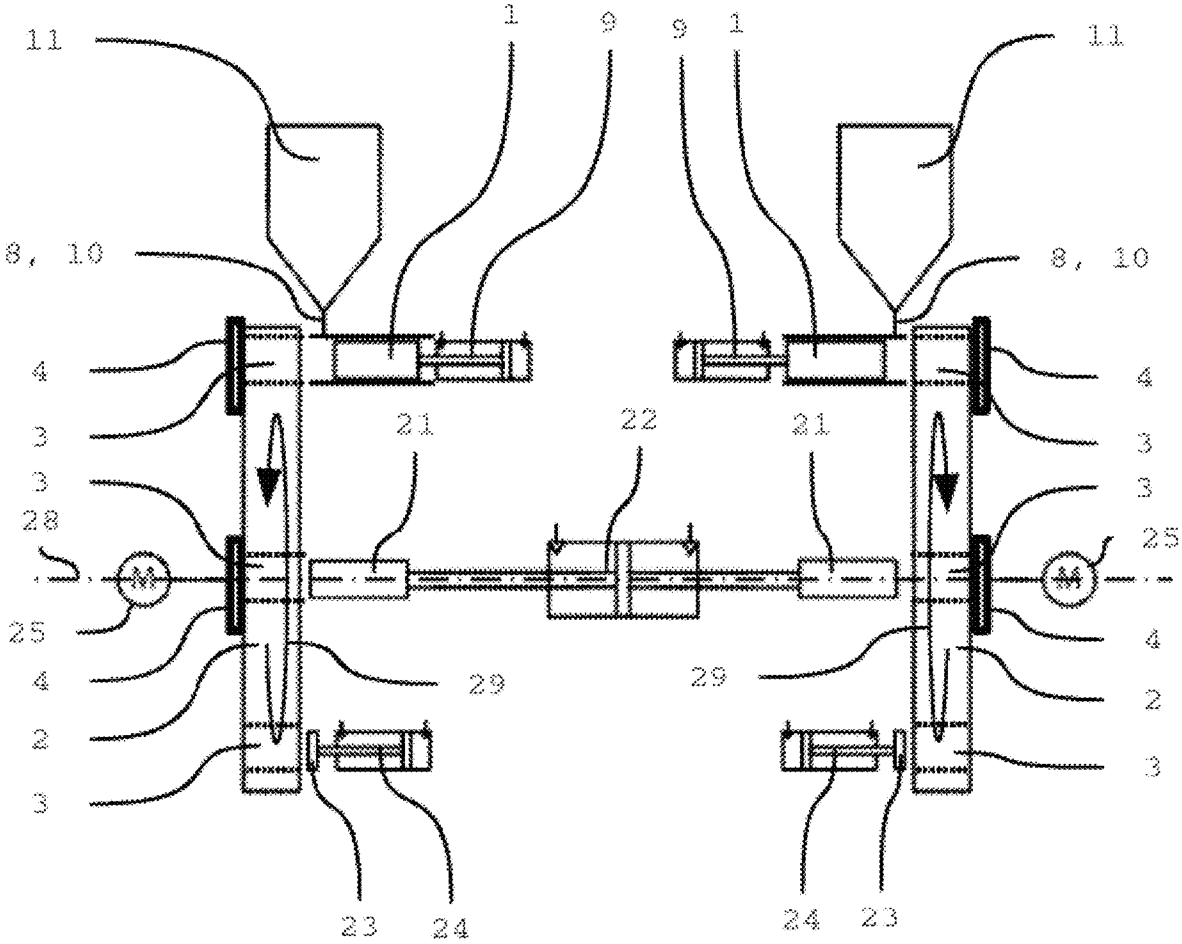
FIG. 2 shows a schematic illustration of an arrangement for the pressing process with one feedstock feed, one pre-pressing punch with a pre-pressing cylinder, one main pressing punch at a main pressing cylinder operating as a synchronous cylinder and one ejection punch with an ejection cylinder on each of two drivable, rotatable die tool discs with pressing dies arranged therein, the die tool discs having a coincident rotation axis.
Figure 3:
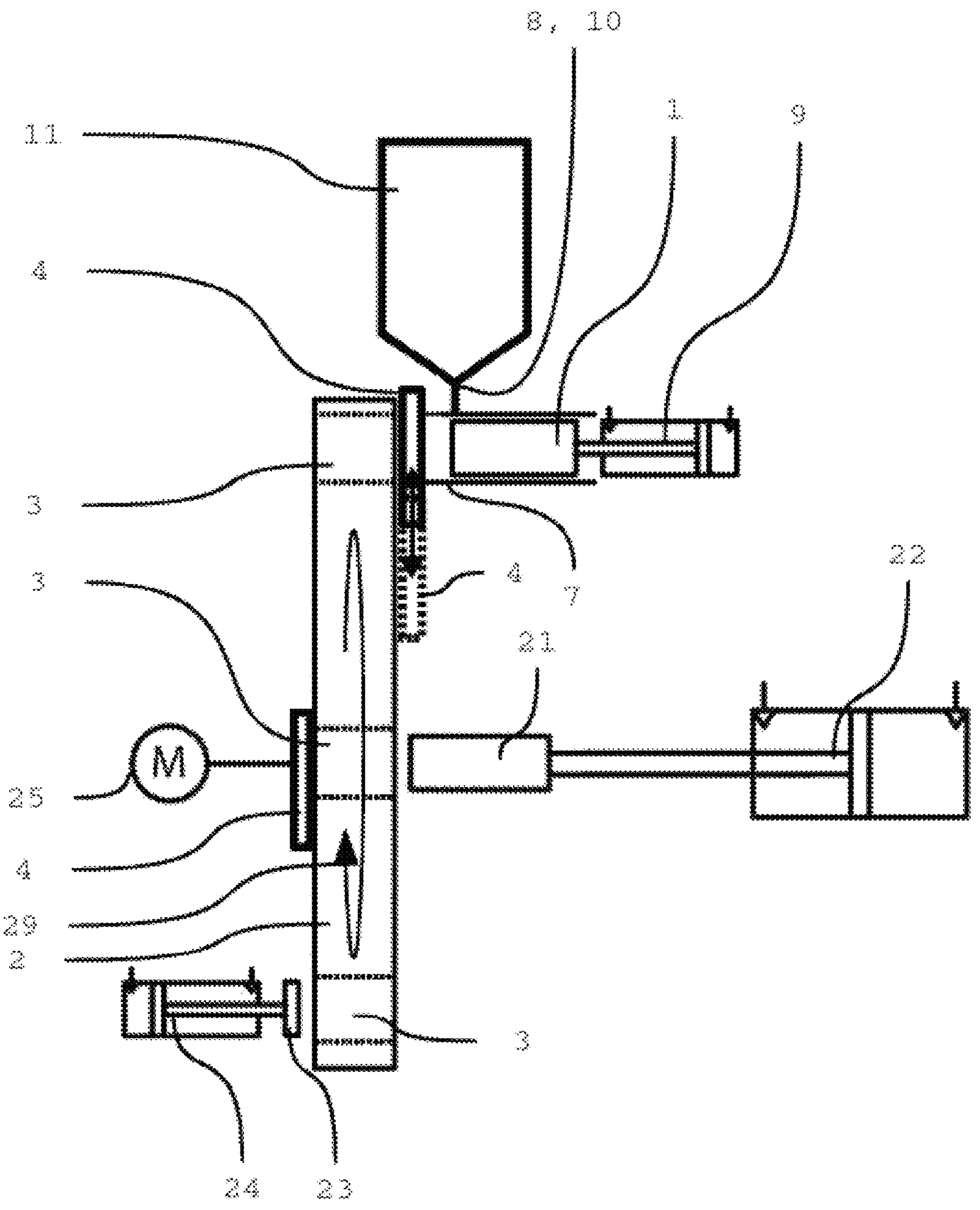
FIG. 3 shows a schematic illustration of an arrangement for a pressing process with a feedstock feed, a pre-pressing punch with a pre-pressing cylinder, a main pressing punch with a main pressing cylinder and an ejection punch with an ejection cylinder at a driveable, rotatable die tool disc with pressing dies arranged therein, where the pre-pressing punch with the pre-pressing cylinder and the main pressing punch with the main pressing cylinder are arranged to be parallel and to have the same working direction and the ejection punch with the ejection cylinder arranged to be parallel to the pre-pressing punch with the pre-pressing cylinder and to the main pressing punch with the main pressing cylinder, but is arranged with a contrary, i.e. opposite, working direction as well as with a pivotable counter-pressing plate between the pre-pressing punch or filling channel, respectively, and the pressing die.
Figure 4:
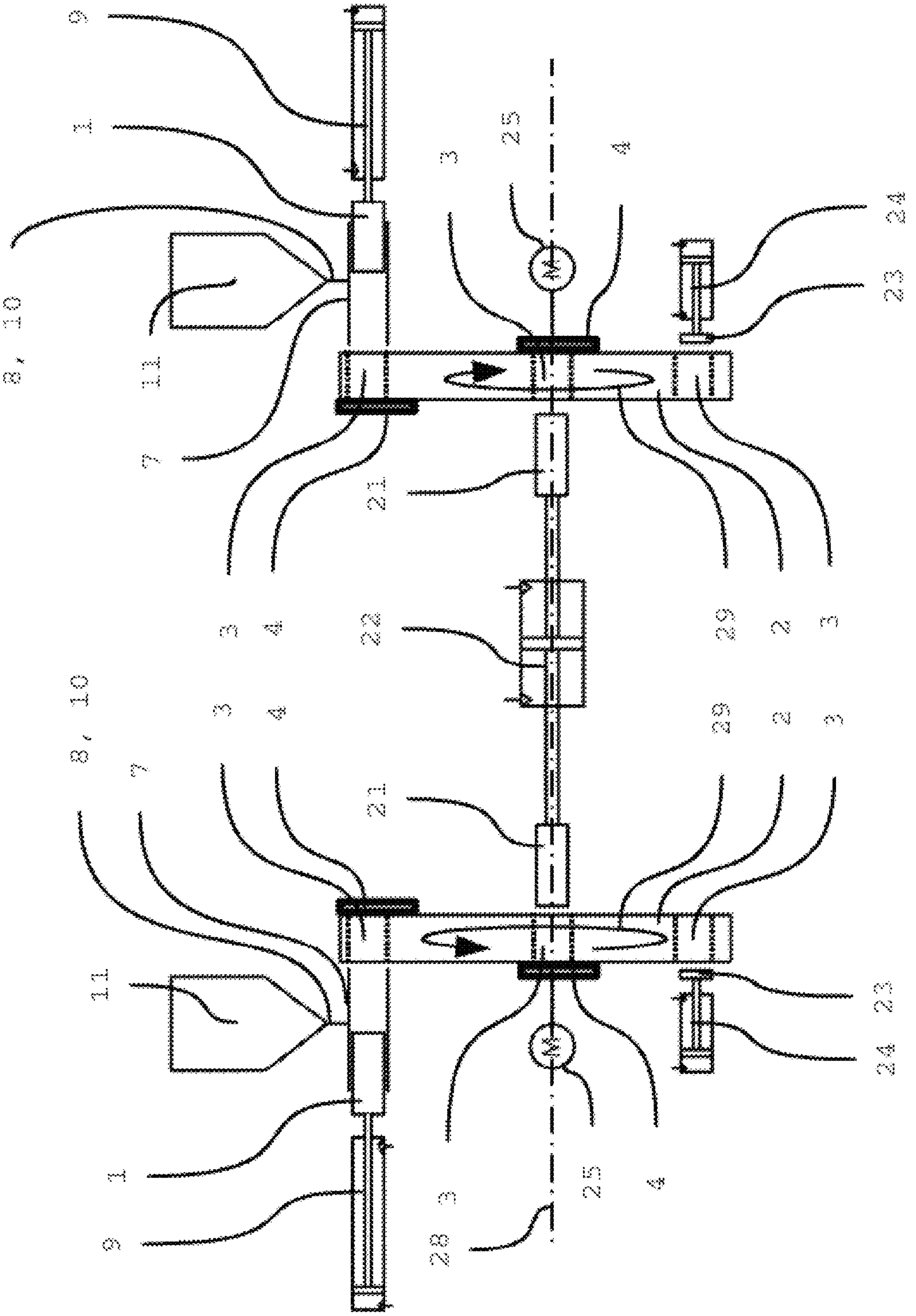
FIG. 4 shows a schematic illustration of an arrangement for a pressing process with a feed for feedstock, a pre-pressing punch with a pre-pressing cylinder, a main pressing punch with a main pressing cylinder operating as a synchronous cylinder and an ejection punch with an ejection cylinder at each of two driveable, rotatable die tool discs with pressing dies arranged therein, where the die tool discs have a coincident rotation axis and in which the pre-pressing punch with the pre-pressing cylinder and the main pressing punch are arranged to be parallel and to have the same working direction and the main pressing punch with the main pressing cylinder is arranged to be parallel to each of the pre-pressing punch with the pre-pressing cylinder and the ejection punch with the ejection cylinder, however with a contrary, i.e. opposite, working direction.

Identical pressing directions are shown in FIGS. 1 to 3, 15 and 16. FIG. 4 shows opposite pressing directions for pre-pressing and main pressing.

Ejection or the ejection direction of the compact is determined by the respective subsequent process or by the periphery for further processing of the compact. Depending on the requirement, ejection is simultaneous or, departingly, sequential relative to at least one of the pressing processes of pre-pressing or main pressing. In addition and depending on the requirement, ejection is in the same direction or in opposite direction relative to at least one of the pressing processes of pre-pressing or main pressing.

Figure 15:
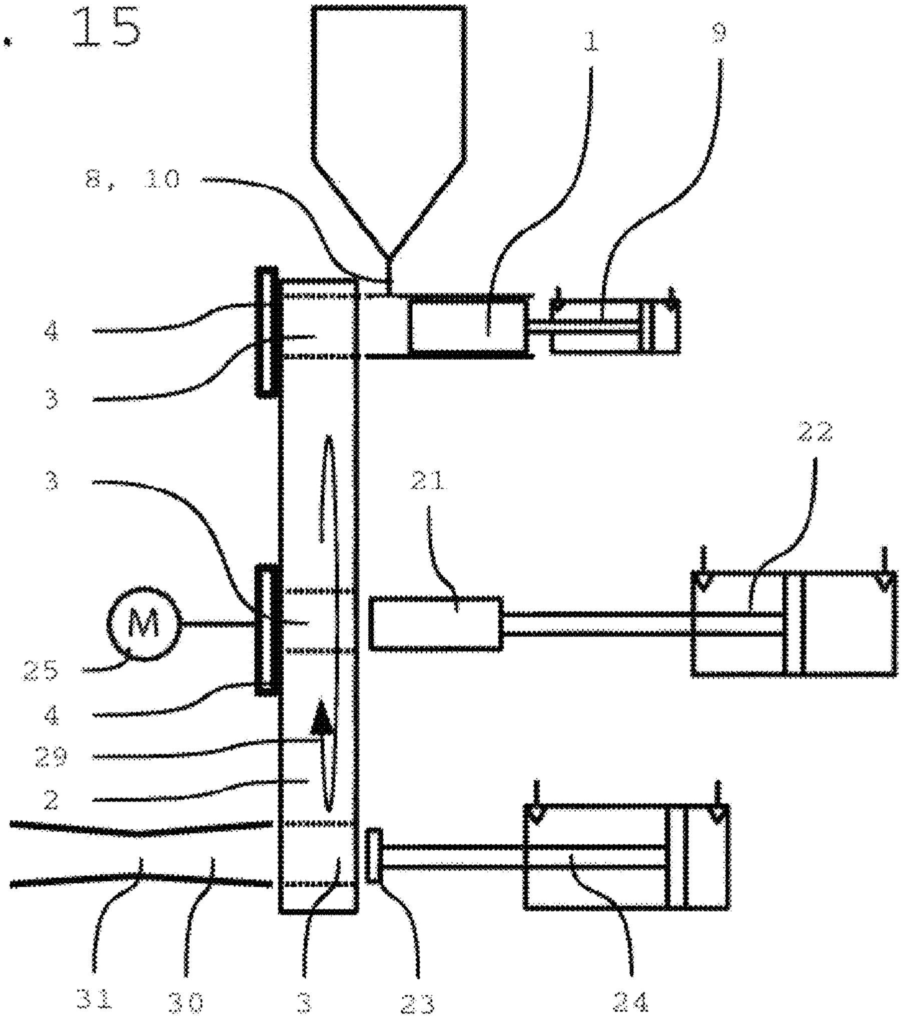
FIG. 15 shows a schematic illustration of an arrangement for a pressing process with feedstock feed, a pre-pressing punch with a pre-pressing cylinder, a main pressing punch with a main pressing cylinder and an ejection punch with an ejection cylinder at a drivable, rotatable die tool disc with pressing dies arranged therein, where a shaping channel with a region of a constriction is provided on the side of the pressing die opposite the at least one ejection punch and an enlarged cylinder is arranged as a drive for the ejection punch.

In FIGS. 1, 2 and 15, ejection is in the same direction as pre-pressing and main pressing. In FIG. 3, ejection is in opposite direction to pre-pressing and main pressing. In FIG. 4, ejection is in opposite direction to main pressing and in the same direction as pre-pressing.

Alternatively to the exemplary embodiments of the arrangement according to the invention illustrated in FIGS. 3 and 4, it is also provided that the main pressing punch 21 and the ejection punch 23 act in the same working direction whereas the pre-pressing punch 1 acts in the contrary, i.e., opposite direction.

The feedstock 11 is conveyed into the pressing die 3 for pre-pressing and is pressed by means of the pre-pressing punch 1 or the stuffing screw 17 against a fixed counter-pressing plate 4 behind. In this way, a pre-agglomerate 12 is produced. The pressing die 3 is continuous. This facilitates pre-pressing and also main pressing against the counter-pressing plate 4, on the one hand, and ejection of the compact from the pressing die 3, on the other hand. Thus, the respective pressing directions can be selected according to the process requirements. The counter-pressing plate 4 is provided on the side of the pressing die 3 side opposite the pre-pressing punch 1 or stuffing screw 17 and the main pressing punch 21. This is shown in FIGS. 1 to 16.

Figure 16:
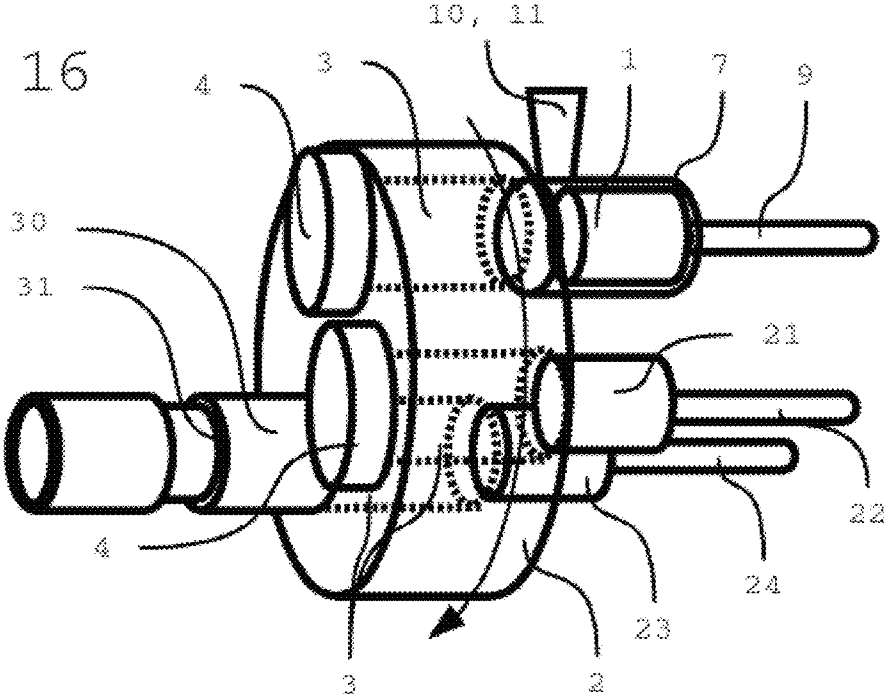
FIG. 16 shows a schematic spatial illustration of an arrangement for a pressing process with a pre-pressing punch with a pre-pressing cylinder, having a counter-pressing plate on the side of the pressing die opposite the at least one pre-pressing punch and a main pressing punch with a main pressing cylinder having a counter-pressing plate on the side of the pressing die opposite the at least one main pressing cylinder and an ejection punch with an ejection cylinder and a shaping channel with a region of a constriction on the side of the pressing die opposite the at least one ejection punch, the ejection being into the shaping channel.

A shaping channel 30 with a constriction 31, for example with stepwise reduced course in the specific exemplary embodiment, may be provided opposite the ejection punch 23, This is shown in FIG. 16. In this case, the compact is ejected by means of the ejection punch 23 from the pressing die 3 into the shaping channel 30 with a region of a constriction 31. Inside this shaping channel 30, a string of compacts is formed, the respective compacts being pushed one position further into the shaping channel 30 at each ejection.

Depending on the embodiment, the respective pressing dies 3 each are moved from the pre-pressing position, i.e. from the pre-pressing of the fed feedstock 11 into the pre-agglomerate 12 by means of the respective pre-pressing punch 1 or respective stuffing screw 17, into the main pressing position, i.e. to the respective main pressing punch 21 for the main pressing of the pre-agglomerate 12 into a compact, and into the ejection position, i.e. for ejecting the compact by means of the at least one ejection punch 23.

For this purpose, the respective pressing dies 3 are arranged in at least one die tool receptacle 2. Preferably, the die tool receptacle 2 is a round or polygonal die tool disc 2 or die tool ring 2 rotatable around a rotation axis 28, or at least one radially arranged die tool arm 2 extending from the rotation axis 28 and rotatable around the rotation axis 28, in which the continuous pressing die 3 or the continuous pressing dies 3 are arranged.

Depending on the embodiment and demand, one or several pressing dies 3 are arranged to be distributed in the respective die tool receptacle 2. Thus, multiple pressing dies 3 can be provided for pre-pressing and main pressing and, if separate, for ejection. Thus, with two or more pressing dies, pre-pressing punches 1 or stuffing screws 17 are allocated to one group of pressing dies 3, main pressing punches 21 are allocated to another group of pressing dies 3 and ejection punches 23 are allocated to yet another group of pressing dies 3, whereby a high efficiency of the method is achieved. For this purpose, the pressing dies 3 can be arranged such that the next pressing process is performed either at each sequential rotation of the die tool receptacle 2 or at a later sequential rotation of the die tool receptacle 2.

By the rotating movement of the die tool receptacle 2 around the rotation axis 28, the pressing dies 3 are sequentially moved to different fixed positions distributed in the circumferential direction, from pre-pressing to main pressing, from main pressing to ejection as well as from ejection again to pre-pressing. The rotating movement is sequential, and thus the die tool receptacle 2 is sequentially rotating since the die tool receptacle 2 stands still for each pressing process.

Corresponding to the pressing dies 3 allocated to pre-pressing, pre-pressing punches 1 are provided. Likewise, main pressing punches 21 are provided corresponding to the pressing dies 3 allocated to main pressing and, if separate, ejection punches 23 are provided corresponding to the pressing dies 3 for ejection. Consequently, several pressing dies can be provided, preferably arranged such that pre-pressing, main pressing and ejection, if separate, can be performed simultaneously and plurally.

Thus, in a specific exemplary embodiment, the respective pressing die 3 with the pre-agglomerate 12 therein is moved by means of a sequentially rotating die tool disc 2 until in front of the main pressing punch 21. Now, main pressing is performed in the same pressing die 3 at a high pressure. The pressure is determined by the feedstock 11 and the design of the main pressing punch 21 and the drive of the main pressing punch 21.

In the specific exemplary embodiment, hydraulic cylinders are used as pre-pressing cylinder 9, main pressing cylinder 22 and ejection cylinder 24 to drive the pre-pressing punch 1, the main pressing punch 21 and the ejection punch 23.

In the specific exemplary embodiments, the drive for the die tool receptacle 2 is a stepper motor or a servo-motor.

It is possible that two or more pre-pressing, main pressing and/or ejection processes can be performed individually or groupwise in parallel as well as at the same time.

Accordingly, the respective pre-pressing punches 1 or stuffing screw 17, the at least one main pressing punch 21 as well as the respective provided ejection punches 23 act successively or at the same time on the respective allocated pressing die 3 or allocated pressing dies 3. The respective pre-pressing punches 1 or the respective stuffing screw 17, the at least one main pressing punch 21 as well as the respective provided ejection punches 23 each act unilaterally on the respective allocated pressing die 3 or allocated pressing dies 3. With this method, the respective pre-pressing punches 1 or the respective stuffing screw 17, the at least one main pressing punch 21 as well as the respective ejection punches 23 provided can act in the same direction or different directions on the respective allocated pressing die 3 or allocated pressing dies 3. However, the respective directions are parallel to each other. The respective pressing die(s) 3 are arranged at different fixed positions distributed in the circumferential direction on the die tool receptacle 2 that sequentially rotates around a rotation axis 28.

In a specific exemplary embodiment, the compact is ejected or demoulded from the pressing die 3 by means of an ejection punch 23 with a small hydraulic cylinder as ejection cylinder 24 after a further rotating movement of the die tool receptacle 2. Ejection can be as a loose drop on a conveyor belt, into a fixed receptacle or to a subsequent process.

In an alternative embodiment, ejection by means of the ejection punch 23 is performed into a shaping channel 30 that has a constriction 31 with a conical course and subsequent flare. This allows the counter-pressure produced to be smaller than that of the main pressing punch 21 since the compact is already fully pressed and only needs to be conveyed into the shaping channel 30. Depending on the peripheral process and pressure conditions, the compacts may be required to seal the shaping channel 30. Likewise, inside the shaping channel 30, a string of compacts is formed, the respective compacts being pushed one position further into the shaping channel 30.

After ejection of the compact, the pressing process starts again with the feeding of the feedstock 11, pre-pressing of the feedstock 11 into a pre-agglomerate 12, main pressing of the pre-agglomerate 12 into a compact and subsequent ejection, the pressing die 3 being moved for pre-pressing, main pressing and ejection.

Pre-pressing can be done in various ways, as shown in FIGS. 5 to 14.

Figure 5:
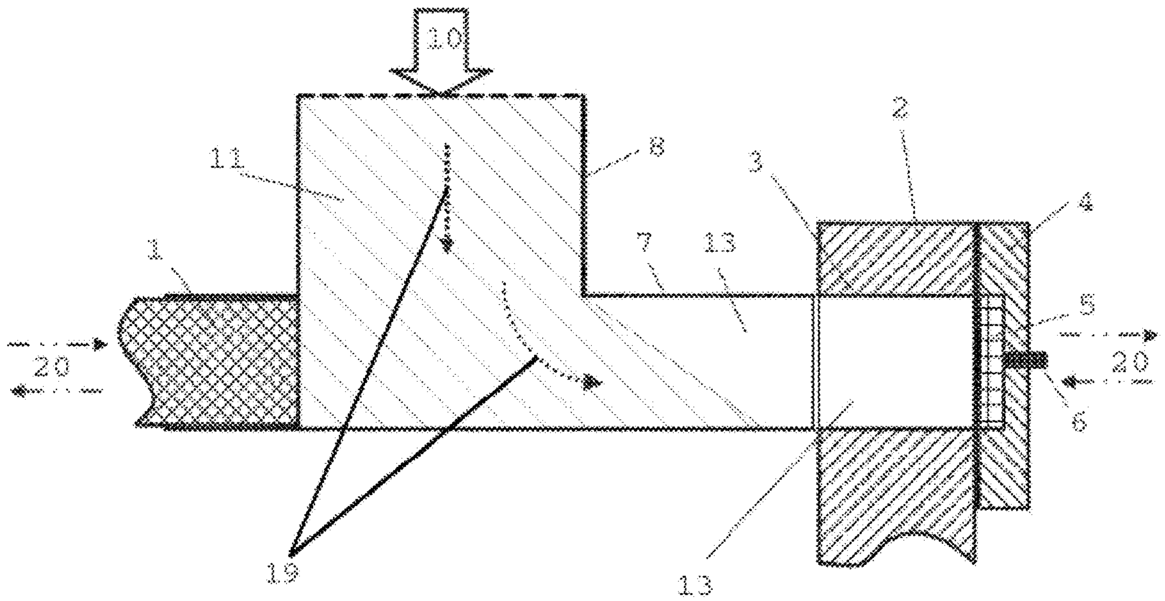
FIG. 5 shows a schematic illustration as a sectional view of pre-pressing with a pre-pressing punch and feedstock feed into a filling channel.
Figure 6:
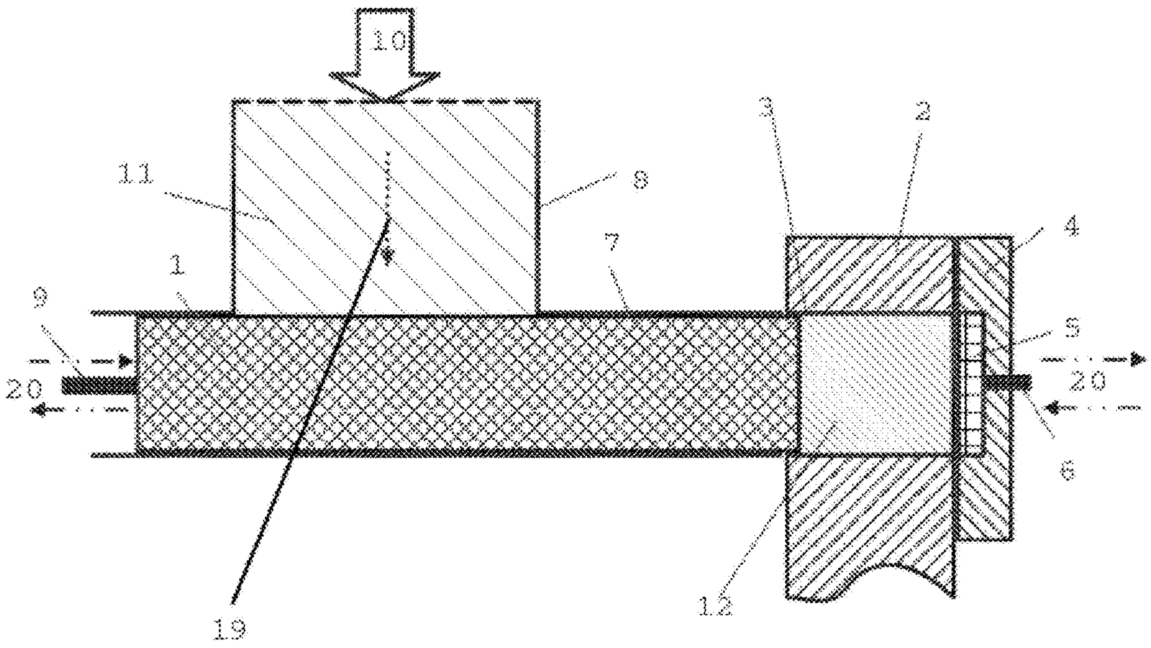
FIG. 6 shows a schematic illustration as a sectional view of pre-pressing with a pre-pressing punch and with pre-pressed feedstock as a pre-agglomerate in the pressing die.

As shown in FIGS. 5 and 6, a pre-pressing punch 1 with a hydraulic cylinder of a small diameter as the pre-pressing cylinder 9 receives the feedstock 11 in loose and uncompacted form in the pre-pressing channel 7 below the filling duct 8 and conveys it directly into the pressing die 3 which is provided or mounted in or on the sequentially rotating die tool receptacle 2. Only when the feedstock 11 has been conveyed into the pressing die 3 is the necessary pre-pressing pressure built up and the pre-agglomerate 12 thus produced. As shown, the pre-pressing channel 7 leads into the pressing die 3.

Figure 7:
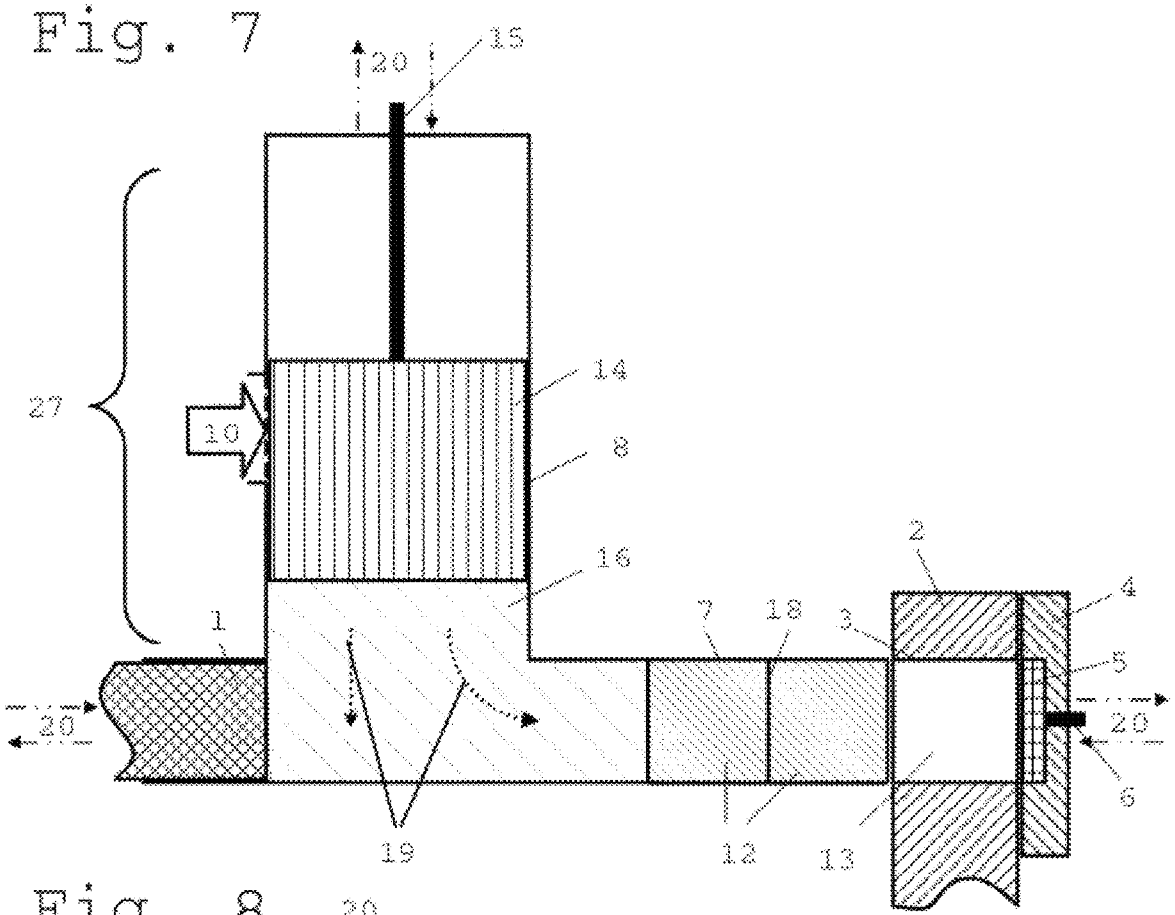
FIG. 7 shows a schematic illustration as a sectional view of pre-pressing with a pre-pressing punch and with feedstock feed and vertical pre-compaction by means of a pre-compaction punch, where a pre-pressing channel is provided in front of the pressing die, in which pre-compacted and already pre-pressed feedstock and an empty pressing die is provided for receiving pre-pressed feedstock as a pre-agglomerate.
Figure 8:
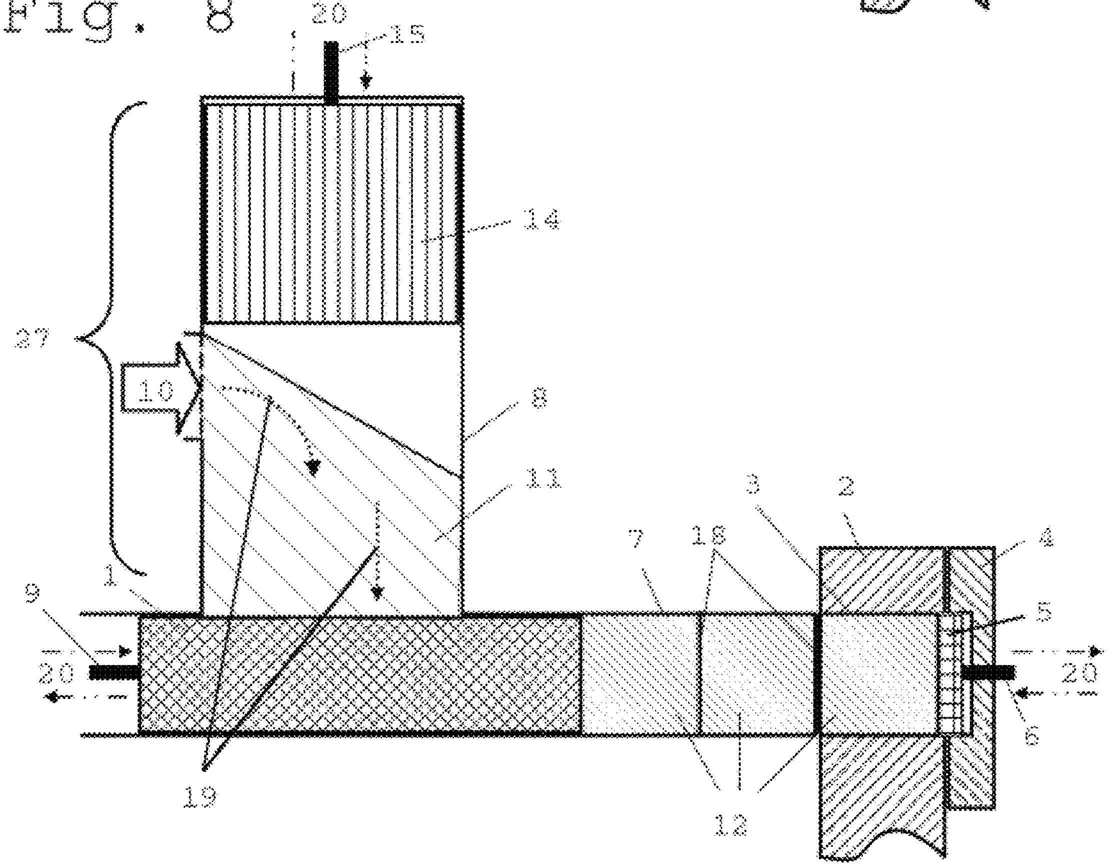
FIG. 8 shows a schematic illustration as a sectional view of pre-pressing with a pre-pressing punch and with feedstock feed and vertical pre-compaction, where a pre-pressing channel is provided in front of the pressing die, in which pre-compacted feedstock is pre-pressed and already pre-pressed feedstock is present, and a pressing die is provided, in which a pre-agglomerate is pressed in and loose and uncompacted feedstock is already fed above the pre-pressing punch in the pressing position, the positioning punch having positioned the pre-agglomerate into the boundary region or transition region between the pre-pressing channel and the pressing die.
Figure 9:
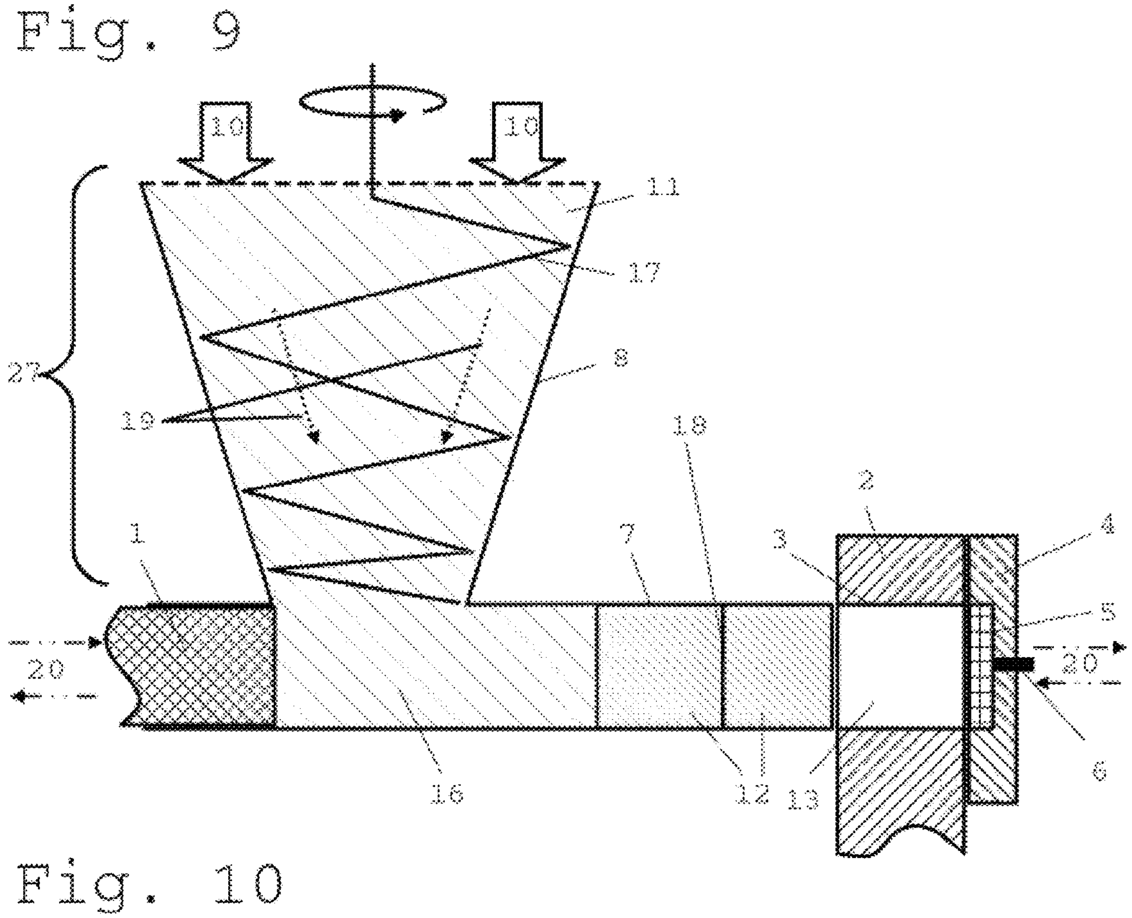
FIG. 9 shows a schematic illustration as a sectional view of pre-pressing with a pre-pressing punch and with feedstock feed and vertical pre-compaction by means of a stuffing screw as a pre-compaction screw, where a pre-pressing channel is provided in front of the pressing die, in which channel pre-compacted feedstock and already pre-pressed feedstock is present, and an empty pressing die is provided for receiving pre-pressed feedstock as a pre-agglomerate.
Figure 10:
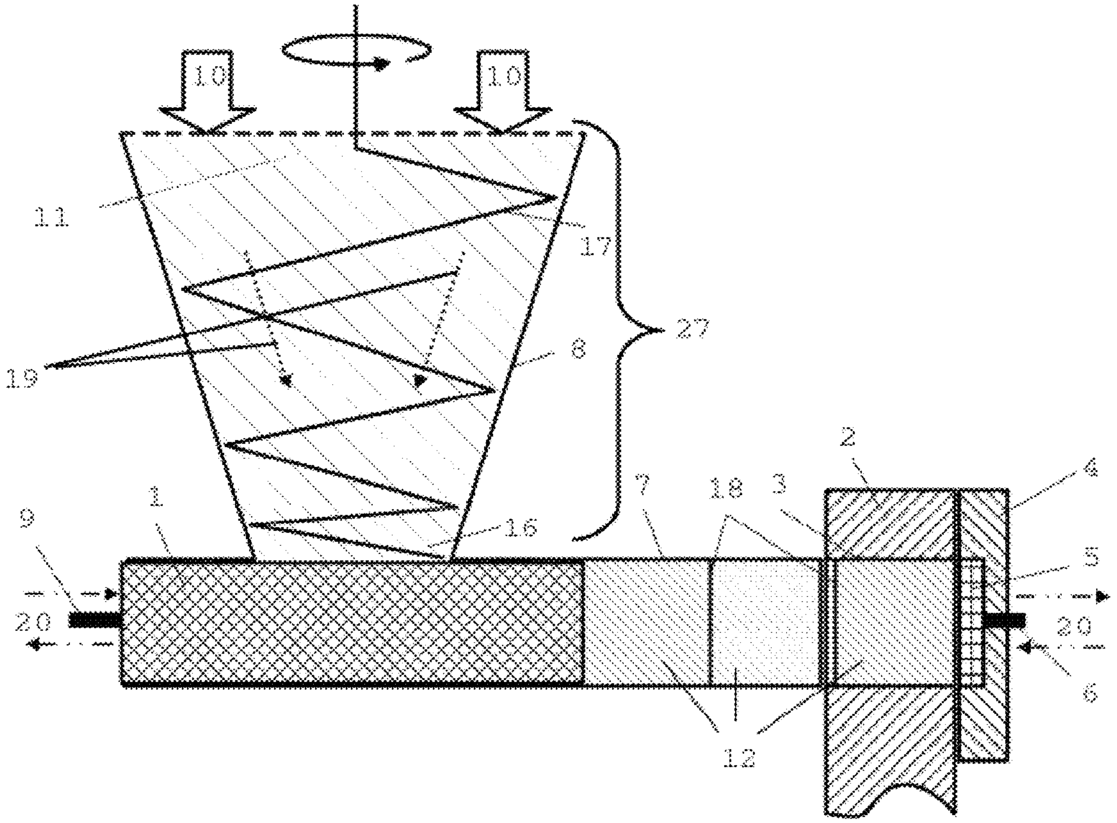
FIG. 10 shows a schematic illustration as a sectional view of pre-pressing with a pre-pressing punch and with feedstock feed and vertical pre-compaction, where a pre-pressing channel is provided in front of the pressing die, in which channel pre-compacted feedstock is pre-pressed and already pre-pressed feedstock is present, and a pressing die is provided, in which a pre-agglomerate is pressed in and loose feedstock and feedstock compacted by the stuffing screw as a pre-compacting screw is already fed above the pre-pressing punch in the pressing position.
Figure 11:
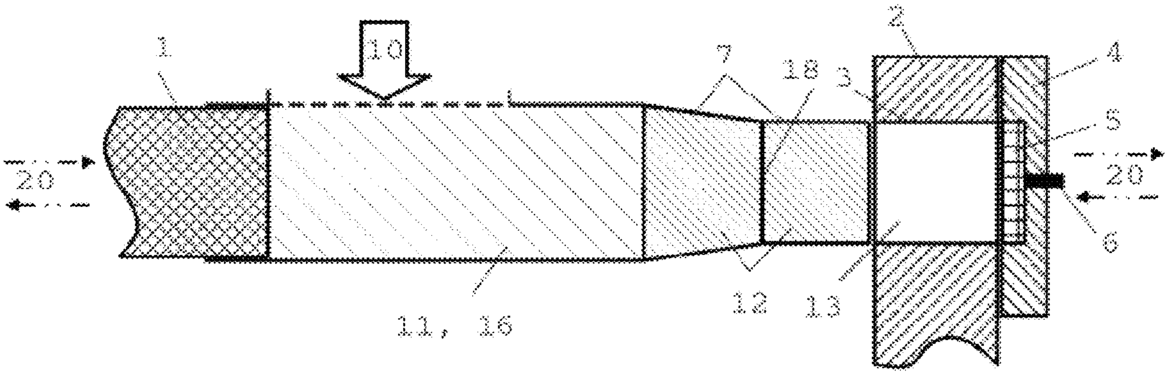
FIG. 11 shows a schematic illustration as a sectional view of a pre-pressing unit with a pre-pressing punch and with feedstock feed, where a pre-pressing channel is provided in front of the pressing die with a tapering cross-section, in which already compacted feedstock, already pre-pressed feedstock and an empty pressing die is provided for receiving pre-pressed feedstock as a pre-agglomerate.
Figure 12:
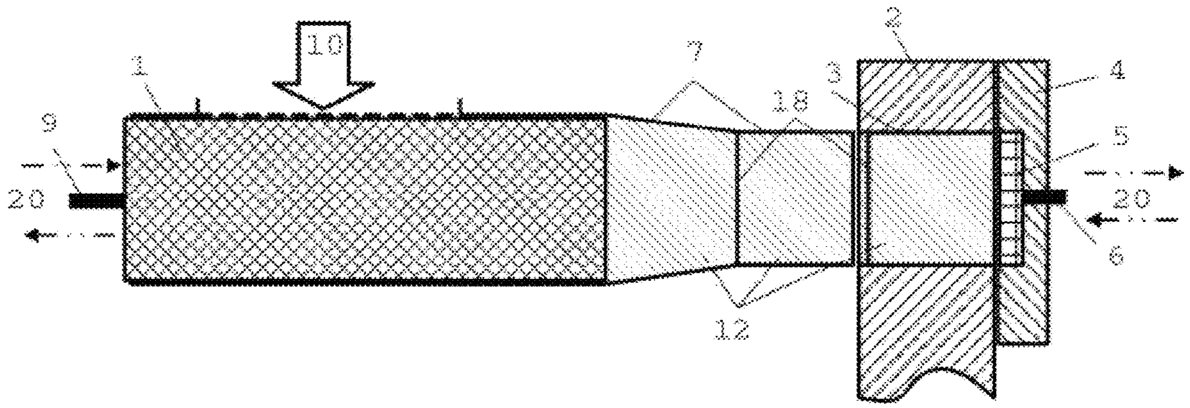
FIG. 12 shows a schematic illustration as a sectional view of a pre-pressing unit with a pre-pressing punch and with feedstock feed, where a pre-pressing channel is provided in front of the pressing die with a tapered cross-section, in which channel already pre-compacted feedstock and an empty pressing die is provided, into which a pre-agglomerate is pressed in, and a pre-pressing punch is provided in the pre-pressing channel, being in pre-pressing position.

FIGS. 7 to 10 show that a pre-pressing punch 1 with a hydraulic cylinder of a small diameter as the pre-pressing cylinder 1 receives the feedstock 11 which has already been pre-compacted in the filling duct 8, for example by means of a stuffing screw 17, as shown in FIGS. 9 and 10, or by means of a vertical compactor 27 as a pre-compacting punch 14, as shown in FIGS. 7 and 8, and conveys the pre-compacted feedstock 11 into the pressing die 3, whereby the appropriate pre-pressing pressure is built up and the pre-agglomerate 12 is formed for the subsequent main pressing process. Pre-pressing with the pre-compactor 27 can be performed from above at an angle of less than or equal to 90 degrees to the movement direction of the pre-pressing punch 1, i.e., inclined towards the drive of the pre-pressing punch 1 or inclined away from the pressing die 3, respectively, whereby the pre-compaction is performed in the direction of the subsequent pre-pressing. The pre-compaction drive can be implemented by means of a hydraulic cylinder, pneumatic cylinder, linear motor or by means of a pre-compaction unit driven by a worm gear.

FIGS. 7 to 10 further show that pre-pressing by means of the pre-pressing punch 1 is also performed already outside the pressing die 3 in the pre-pressing channel 7. Here, several pre-agglomerates 12 are waiting in line in the pre-pressing channel 7, and each time fed feedstock 11 is pre-pressed, the "string" of pre-agglomerates 12 is pushed one position further. Thereby, each time exactly one pre-agglomerate 12 is conveyed into the pressing die 3. The pressure required for pre-pressing is built up already in the pre-pressing channel 7 on the loose feedstock 11 that has been fed last by pressing the feedstock 11 against the preceding pre-agglomerate 12. Thus, a pre-pressing series is performed as multiple pre-pressing. By conveying the respective pre-agglomerate 12 into the pressing die 3, the pre-pressing thereof is complete. As shown, the pre-pressing channel 7 leads into the pressing die 3.

The respective drives of the pre-pressing punches 1 or pre-compaction punches 14 shown in FIGS. 5 to 12 may be hydraulic cylinders as the pre-pressing cylinder 9 or pre-compaction cylinder 15, only the piston rods 9 of the respective pre-pressing punches 1 or of the pre-pressing cylinder 9 as well as the pistons rods 15 of the respective pre-compaction punches 14 pre-compaction cylinder 15 being shown for simplification.

Likewise simplistically, only the piston rod 6 of the positioning punch 5 or positioning cylinder 6 is shown exemplarily of the positioning punch 5 in FIGS. 5 to 14.

Figure 13:
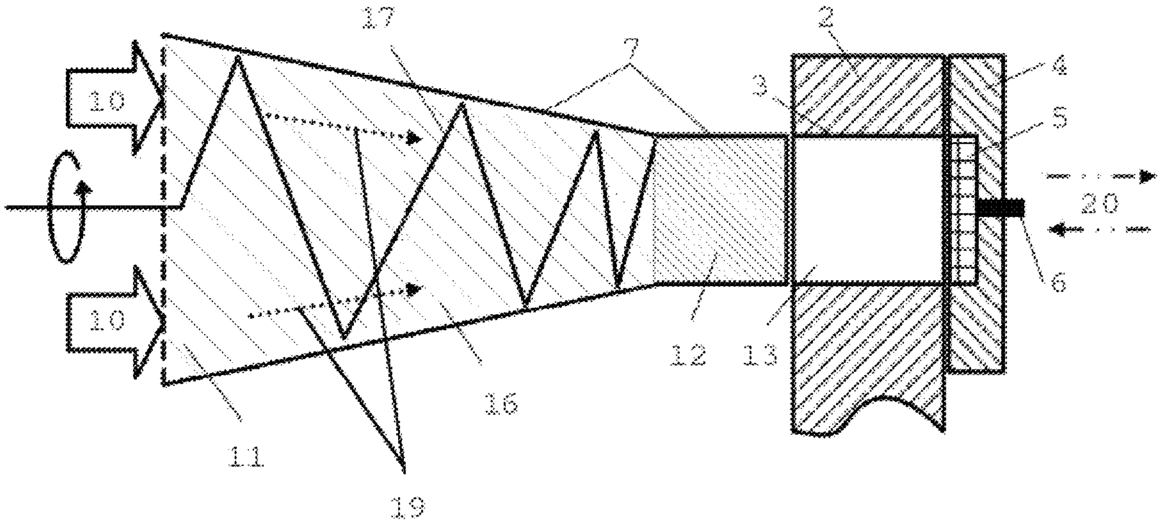
FIG. 13 shows a schematic illustration as a sectional view of pre-pressing with a stuffing screw as a pre-pressing screw with a tapered cross-section and feedstock feed into and through the stuffing screw as a pre-pressing screw, where already compacted feedstock is present in front of the pressing die and an empty pressing die is provided for receiving pre-pressed feedstock as a pre-agglomerate.
Figure 14:
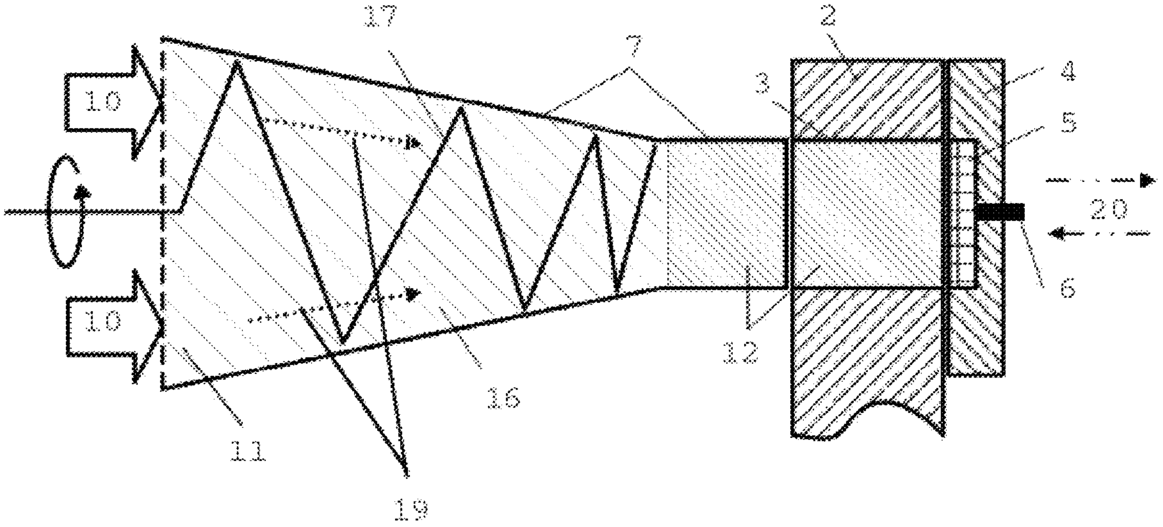
FIG. 14 shows a schematic illustration as a sectional view of pre-pressing with a stuffing screw as a pre-pressing screw with a tapered cross-section and feedstock feed into and through the stuffing screw as pre-pressing screw, in which a pre-agglomerate is pre-pressed in front of and pressed into the pressing die.

As shown in FIGS. 13 and 14, the pre-pressing channel has a tapered portion, whereby the pre-agglomerates are further compacted inside the pre-pressing channel. The tapered portion of the pre-pressing channel 7 can also be combined with pre-compaction unit.

Pre-pressing by means of a stuffing screw 17 is shown in FIGS. 13 and 14. In this case, operation of a pre-pressing punch 9 is dispensed with, and instead a continuous string of compacted feedstock 11 is conveyed into the pressing die 3 by means of the stuffing screw 17. This string is shorn off during the sequential rotation of the die tool receptacle 2. As shown, the pre-pressing channel 7 leads into the pressing die 3.

Feeding of the feedstock 11 for pre-pressing is dynamic, with the quantity of the fed feedstock 11 being influenced by means of the at least one pre-pressing punch 1 or by means of the pre-compacting unit 27 so that the sizes of the pre-agglomerates 12 are preferably equalized. For this purpose, the travel path of the pre-pressing punch 1 or drive is measured and the quantity of the feedstock 11 is adjusted based on the measurement. For example, based on travel path measurement, the pre-pressing punch 1 is thus only retracted as far as to allow the desired quantity of feedstock 11 to get in front of the pre-pressing punch 1 or into the pre-pressing channel 7 in front of the pre-pressing punch 1. Depending on the feedstock 11, this either already falls towards the pressing die 3 so that, depending on the feedstock 11, the pre-pressing punch 1 does not have to unblock the input opening 10 or feed 10 for the feedstock 11. This varies depending on the feedstock 11 and the individual state thereof. Depending on the quantity of the fed feedstock 11, the travel path of the pre-pressing punch 1 varies during pre-pressing. Accordingly, the pre-pressing punch 1 is moved for a subsequent pre-pressing process in an adapted manner such that the required quantity of feedstock 11 is fed or gets in front of the pre-pressing punch 1.

Pre-pressing presses the feedstock 11 into a pre-agglomerate 12 of a positionally stable shape.

Due to the aggregate being built in a modular manner, an optimal pre-pressing device can be implemented for the respective feedstock 11. The pre-pressing device to be used largely depends on the conveying properties of the respective feedstock 11 as well as on the relationship between the bulk density and the subsequent density of the compact. This offers the possibility to apply the optimal solution in terms of energy and process-technology depending on the feedstock 11.

For exact positioning of the agglomerate 12 in the pressing die 3, a positioning unit is provided. For this purpose, a positioning punch 5 is provided on the side of the pressing die 3 opposite the respective pre-pressing punch 1 and with a main working direction contrary to the pre-pressing punch 1. A positioning punch 5 is provided in each of FIGS. 5 to 14. The positioning punch 5 is arranged in the counter-pressing plate 4 in each case.

In FIG. 8, the positioning punch 5 is extended as far as to push the pre-agglomerate 12 in the pressing die 3 back to an extent that the surface boundary 17 thereof as the contact surface 17 to the pre-agglomerate 12 that follows in the pre-pressing channel 7 is in alignment with the surface of the die tool receptacle 2, for example as a die tool disc 2.

Furthermore, positioning of the pre-agglomerate 12 can be required if the feedstock has residual elasticity and relaxes and expands after pre-pressing both in the direction of the pre-pressing punch 1 and in the direction of the counter-pressing plate 4. By positioning, the pre-agglomerate 12 is pushed into a central position in the pressing die 3 so that the pre-agglomerate 12 does not protrude from the pressing die 3. Positioning can also be required if the pre-agglomerates 12 have different sizes due to different feedstock quantities or pre-pressing cycles or, depending on the feedstock 11, have a uniform small size and a plurality of pre-agglomerates 12 is present inside the pre-pressing channel 7, which however fit in the pressing die 3 together, depending on their size. Thus, this may also require a correction of the position to be performed.

The arrangement for manufacturing compacts according to the invention comprises at least one pressing die 3 in at least one die tool receptacle 2 with a feed 10 for the feedstock 11. Correspondingly to the respective pressing die 3, a pre-pressing punch 1, as shown in FIGS. 1 to 12, 15 and 16, or a stuffing screw 17, as shown in FIG. 13 or 14, are arranged. Furthermore, as shown in FIGS. 1 to 4 and 15 and 16, one main pressing punch 21 is arranged correspondingly to one pressing die 3. As shown in FIGS. 1 to 4, 15 and 16, the die tool receptacle 2 is rotatable so that the pressing dies 3 can move from the pre-pressing punch 1 to the main pressing punch 21 and, if provided, to the ejection punch and again to the pre-pressing punch 1.

The working direction of the respective pre-pressing punch 1 or the respective stuffing screw 17 and the respective main pressing punch 21 is mutually parallel, as shown in FIGS. 1 to 4, 15 and 16. The at least one pressing die 3 is continuous in working direction.

On the side of the pressing die 3 opposite the pre-pressing punch 1, a counter-pressing plate 4 covering the cross-section of the pressing die 3 is provided, as in FIGS. 1 to 16. The counter-pressing plate 4 is arranged to absorb the pre-pressing forces so that these do not act or act only minimally on the die tool receptacle 2. The counter-pressing plate 4 and the drive of the pre-pressing punch 1, for example a hydraulic cylinder, are constructively coupled via a force-absorbing connection 26 so that the pressing process towards the die tool receptacle 2 is almost stressless. The force-absorbing connection 26 is schematically shown in FIG. 1.

Furthermore, on the side of the pressing die 3 opposite the main pressing punch 21, a counter-pressing plate 4 is also provided depending on the embodiment, as shown in FIGS. 1 to 4 and 15, or a shaping channel 30 with a region of a constriction 31, as shown in FIG. 16. The counter-pressing plate 4 and the drive of the main pressing punch 1, for example a hydraulic cylinder as the main pressing cylinder 22, are also constructively coupled via a force-absorbing connection 26 so that the pressing process towards the die tool receptacle 2 is almost stressless. The force-absorbing connection 26 is also schematically shown in FIG. 1.

Furthermore, if ejection is not performed by the main pressing punch 21, at least one ejection punch 23 is provided, as shown in FIGS. 1 to 4 and 15. As shown in FIG. 15, a shaping channel 30 with a region of a constriction 31 is provided on the side of the pressing die 3 opposite the at least one ejection punch 23 or a device for discharging or further processing is provided (not shown). This device for discharging or further processing can be a conveyor belt or a collection box.

Figure 17:
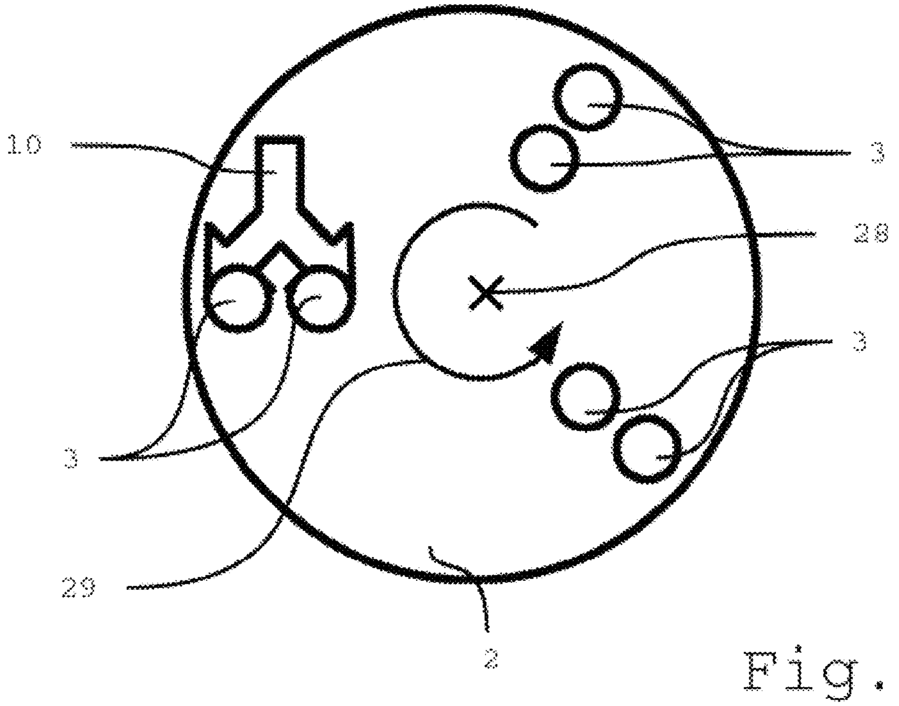
FIG. 17 shows a die tool receptacle as a die tool disc with pressing dies.
Figure 19:
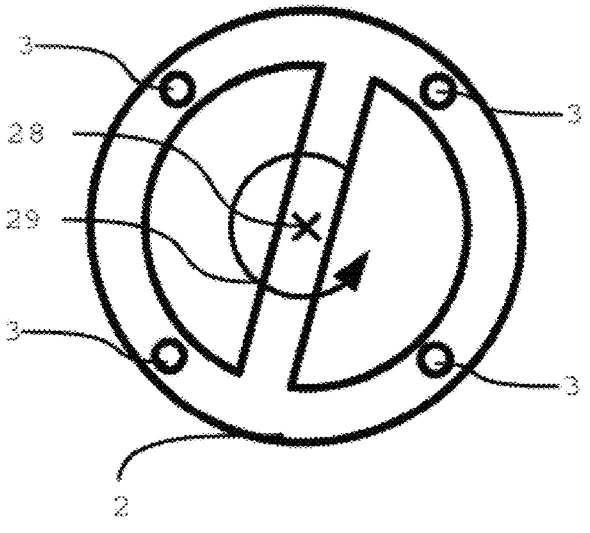
FIG. 19 shows a die tool receptacle as a die tool ring with pressing dies.

In one exemplary embodiment, as shown in FIG. 17, the die tool receptacle 2 is a round die tool disc 2 rotatable around a rotation axis 28. An alternative embodiment of the die tool receptacle 2 is a die tool ring 2 as shown in FIG. 19. The respective pressing dies 3 are distributed in the round die tool receptacle 2 in the circumferential direction, each offset by 120 degrees, and in the die tool ring 2 each offset by 90 degrees. As shown in FIG. 17, the pressing dies 3 are arranged in twos or pairs in the die tool disc 2.

Figure 18:
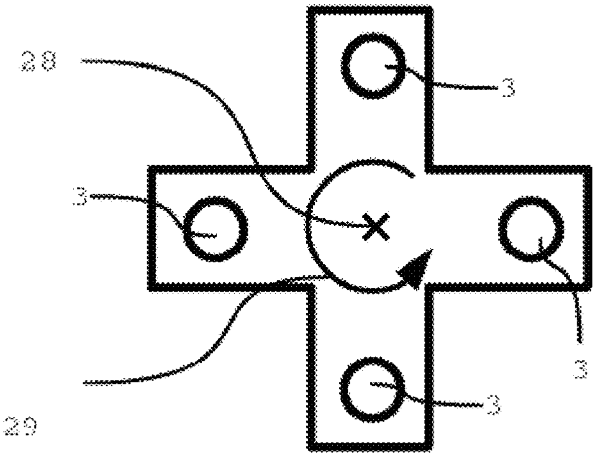
FIG. 18 shows a die tool receptacle as die tool arms with pressing dies.

In the exemplary embodiment as shown in FIG. 18, the die tool receptacle 2 comprises four die tool arms 2 extending radially from a rotation axis 28 and rotatable around the rotation axis 28. The respective pressing dies 3 are arranged in the die tool arms 2. The radially arranged die tool arms 2 of the die tool receptacle 2 and rotatable around the rotation axis 28 are distributed or offset by 90 degrees.

For example, it is provided to have at least one feed of feedstock 11 for each pressing die 3 or to have a common feed 10 for feedstock 11 for two or more pressing dies 3. With a common feed 10 of feedstock 11, the respective pressing dies 3 are arranged side by side in a horizontal plane in the region of the feed 10 of feedstock 11, as shown in FIG. 17.

According to the exemplary embodiment as shown in FIG. 1, the pre-pressing punch 1, the main pressing punch 21 and the ejection punch 23 are arranged at a die tool receptacle 2 as die tool disc 2 to be mutually parallel and to have the same working direction. The feed 10 of the feedstock 11 is from a filling duct 8 into the pre-pressing channel 7. The respective punches 1, 21, 23 are driven by hydraulic cylinders. A motor 25 drives the die tool receptacle 2 as a die tool disc 2 sequentially or stepwise. Counter-pressing plates 4 are provided at the sides of the pressing dies 3 opposite the respective pressing punches 1, 21.

In addition to the arrangement as shown in FIG. 1, the exemplary embodiment in FIG. 2 has another die tool receptacle 2 as die tool disc 2 which is spaced from the first die tool disc 2 and has the same rotation axis 28. The at least one respective main pressing punch 21 is alternately driveable by a common main pressing cylinder 22 operating as a synchronous cylinder arranged between the die tool receptacles 2.

In deviation from FIG. 1, the exemplary embodiment in FIG. 3 has an ejection punch 23 with a working direction contrary to the pressing punches 1, 21. Furthermore, a pivotable counter-pressing plate 4 is provided between the pre-pressing punch 1 or filling channel 7 and the pressing die 3, against which pre-pressing is performed already in the filling channel 7 and, if present, also in the pre-pressing channel. After pre-pressing, the counter-pressing plate 4 is pivoted away and unblocks the way to the respective pressing die 3 leading into the respective pressing die 3 for the pre-agglomerate 12 to be pushed into the pressing die 3.

In deviation from FIG. 2, the exemplary embodiment in FIG. 4 has pre-pressing punches 1 and an ejection punches 23 with a working direction contrary to the respective main pressing punch 21. The main pressing cylinder 22 that drives the main pressing punch 21 works alternately as a synchronous cylinder In deviation from FIG. 1 and according to the exemplary embodiment in FIG. 15, a shaping channel 30 is arranged on the pressing die 3 side opposite the ejection punch 23 and has a conical and local tapered portion 31, into which the compacts are conveyed when ejected.

FIG. 16 shows an arrangement for manufacturing compacts, where three pressing dies 3 are provided in a die tool receptacle 2 as die tool disc 2, one pre-pressing punch 1 and one main pressing punch 21 being arranged correspondingly to two of the pressing dies 3. The working direction of the pre-pressing punch 1 and the at least one main pressing punch 21 is parallel to each other and in the same direction. A counter-pressing plate 4 is arranged on the side of the pressing die 3 opposite the pre-pressing punch 1, and a shaping channel 30 with a region of a constriction 31 is arranged on the side of the pressing die 3 opposite the main pressing punch 21. In addition, a movable counter-pressing plate 4 is arranged between the shaping channel 30 and the pressing die 3. The pressing dies 3 is continuous in working direction. The pre-pressing punch 1 movably arranged in a pre-pressing channel 7. The pre-pressing channel 7 leads into the pressing die 3 and has a feed 10 for feedstock 11.

Although FIG. 16 shows a pre-pressing punch 1 and a main pressing punch 21, more than one pre-pressing punch 1 and one main pressing punch 21 can be arranged individually or in groups or alternately in an even distribution in the circumferential direction of the rotary movement of the die tool disc 2, the die tool ring 2 or the die tool arm 2. This advantageously achieves that the force that may be introduced into the die tool disc 2, the die tool ring 2 or the die tool arm 2 acts evenly, thus preventing or at least reducing lever forces acting on the drive and the bearing. According to the arrangement of the pre-pressing punches 1 and main pressing punches 21, the respective pressing dies are also arranged in a corresponding distribution or arrangement, or vice versa, according to the arrangement of the pressing dies in an even distribution in the circumferential direction of the rotating movement of the die tool disc 2, of the die tool ring 2 or of the die tool arm 2, the pre-pressing punch 1 and the main pressing punch 21 are correspondingly arranged to be able to operate the pressing dies at the same time at least for one step, for example main pressing or pre-pressing.

LIST OF REFERENCE NUMERALS

1—Pre-pressing punch
2—Die tool disc, die tool ring, die tool arm, die tool receptacle
3—Pressing die
4—Counter-pressing plate
5—Positioning punch
6—Piston rod of positioning punch, positioning cylinder
7—Pre-pressing channel, filling channel
8—Filling duct
9—Piston rod of pre-pressing punch, pre-pressing cylinder
10—Input opening, feedstock feed
11—Feedstock
12—Pre-agglomerate
13—Bulk-free space
14—Vertical pre-compaction punch
15—Piston rod of pre-compaction punch, pre-compaction cylinder
16—Pre-compacted feedstock
17—Stuffing screw
18—Contact area of two pre-agglomerates, boundary surface of pre-agglomerate
19—Feedstock movement direction
20—Punch movement direction
21—Main pressing punch
22—Piston rod of main pressing punch, main pressing cylinder
23—Ejection punch
24—Piston rod of ejection punch, ejection cylinder
25—Motor
26—Force-absorbing connection
27—Pre-compacting unit
28—Rotation axis
29—Rotary movement
30—Shaping channel
31—Constriction
32—Pre-compaction punch

The invention claimed is:

1. A method for manufacturing compacts by means of two die tool receptacles (2) rotating sequentially around a rotation axis (28), wherein the two die tool receptacles (2) are spaced from each other and the at least one main pressing punch (21) is drivable alternately by a common main pressing cylinder (22) or drive arranged between the die tool receptacles (2), wherein after feeding of feedstock a volume reduction of the feedstock (11) is performed and subsequently main pressing of the feedstock into a compact and ejection of the compact are performed, comprising the steps:

that after feeding the feedstock (11), pre-pressing as a volume reduction into a pre-agglomerate (12) using at least one pre-pressing punch (1) and subsequently main pressing of the pre-agglomerate (12) into a compact in at least one pressing die (3) using at least one main pressing punch (21) and subsequently ejection of the compact from the at least one pressing die (3) by means of at least one ejection punch (23) are performed, pre-pressing, main pressing and ejection being performed simultaneously in a mutually parallel working direction at different fixed positions distributed in the circumferential direction and on one side at the respective position and the die tool receptacle (2) being at a standstill for this purpose, wherein pre-pressing into at least pre-agglomerate (12) is performed in the pressing die (3) and/or in a pre-pressing channel (7), wherein the pre-agglomerate (12) is pre-pressed into a positionally stable shape and a positioning of the pre-agglomerate (12) is performed in the pressing die (3) to correct the position of the pre-agglomerate in the pressing die (3) with a positioning punch (5) is provided on the side of the respective pressing die (3) or the tool receptacle (2) opposite, wherein the working direction of the positioning punch (5) is contrary to that of the pre-pressing punch (1), wherein the main pressing process is performed alternately between at least two pressing dies (3) in the tool receptacles (2) spaced from each other, wherein when the main pressing punch (21) recedes by means of the main pressing cylinder (22) after having pressed a compact, a new compact can be produced at the same time on the other side of the main pressing cylinder (22) by a second main pressing punch (21) arranged on it.

2. The method according to claim 1, characterized in that pre-compacting of the feedstock (11) is performed for pre-pressing.

3. The method according to claim 1, characterized in that the at least one pressing die (3) is moved sequentially to the at least one pre-pressing punch (1), the at least one main pressing punch (21) and the at least one ejection punch (23).

4. The method according to claim 1, characterized in that each time one, two or more pre-pressing processes, main pressing processes and ejections are parallel or at the same time.

5. The method according to claim 1, characterized in that two or more successive pre-pressing processes are preformed, wherein the respective feedstock (11) is pressed against the respective preceding pre-agglomerate (12).

6. The method according to claim 1, characterized in that in case of two or more successive pre-pressing processes, the pre-agglomerates (12) are pushed one position further during pre-pressing, wherein each time one pre-agglomerate (12) is pushed into the pressing die (3) and/or, in case of two or more successive main pressing processes or ejections, the compacts are pushed out of the pressing die (3) or from the pressing die (3) into a shaping channel (30) having a region of a constriction (31), the respective compacts being pushed one position further into the shaping channel (30).

7. The method according to claim 1, characterized in that the feeding of the feedstock (11) for pre-pressing is dynamically controlled, wherein the quantity of the fed feedstock (11) is influenced by means of the at least one pre-pressing punch (1) or by means of the pre-compacting unit (27).

8. The method according to claim 1, characterized in that the quantity of the feedstock (11) is adjusted based on the travel path of the pre-pressing punch (1).

9. The method according to claim 1, characterized in that the at least one pre-pressing punch (1) and/or the at least one main pressing punch (21) and/or the at least one ejection punch (23) act on respectively allocated pressing dies (3) at the same time.

10. An arrangement for the implementation of the process for manufacturing compacts, wherein two die tool receptacles (2) are provided, wherein at least one pressing die (3) is provided in each of the two die tool receptacle (2) rotating sequentially around a horizontal rotation axis (28) and each with a feed (10) for feedstock (11) and wherein the at least one pressing die (3) is able to be arranged or moved correspondingly to at least one pre-pressing punch (1), to at least one main pressing punch (21) and to at least one ejection punch (23), the working directions of the at least one pre-pressing punch (1), of the at least one main pressing punch (21) and of the at least one ejection punch (23) being parallel to each other, wherein a stationary counter-pressing plate (4) with a positioning punch (5) to correct the position of the pre-agglomerate in the pressing die (3) is provided on the side of the respective pressing die (3) or die tool receptacle (2) opposite, wherein the working direction of the positioning punch 5) is contrary to that of the pre-pressing punch (1), and/or a pivotable or movable counter-pressing plate (4) is provided on the side of the respective pressing die (3) facing the at least one pre-pressing punch (1) or die tool receptacle (2) and a stationary counter-pressing plate (4) is provided on the side of the respective pressing die (3) opposite the at least one main pressing punch (21), the at least one pressing die (3) being continuous in the working direction and a pre-pressing channel (7) leads into the respective pressing die (3), wherein the at least one pre-pressing punch (1) is arranged in or leads into at least one pre-pressing channel (7), wherein the two die tool receptacles (2) are spaced from each other and the at least one main pressing punch (21) is drivable alternately by a common main pressing cylinder (22) or drive arranged between the die tool receptacles (2).

11. The arrangement according to claim 10, characterized in that on the side of the respective one pressing die (3) opposite the at least one ejection punch (23), a shaping channel (30) with a region of a constriction (31) or a device or a device for discharging or further processing of the compacts is provided.

12. The arrangement according to claim 10, characterized in that the die tool receptacle (2) is preferably a round or polygonal die tool disc (2) or a die tool ring (2) rotatable around the rotation axis (28), wherein the at least one pressing die (3) is arranged in the at least one rotatable round or polygonal die tool disc (2) or die tool ring (2) as die tool receptacle (2), wherein, in case of two or more pressing dies (3), the pressing dies (3) are arranged distributed or offset in the circumferential direction in the die tool receptacle (2) as a rotatable round or polygonal die tool disc (2) or die tool ring (2), or the die tool receptacle (2) is preferably at least one radially arranged die tool arm (2) extending from the rotation axis (28) and rotatable around the rotation axis (28), wherein the at least one pressing die (3) is arranged in the at least one die tool arm (2), wherein, in case of two or more die tool arms (2) of the die tool receptacle (2) extending from the rotation axis (28) and rotatable around the rotation axis (28), the die tool arms (2) are distributed or offset around the rotation axis (28).

13. The arrangement according to claim 10, characterized in that in case of two or more pressing dies (3), the at least one pre-pressing punch (1), the at least one main pressing punch (21) and/or the at least one ejection punch (23) are each allocated to one of the pressing dies (3).

14. The arrangement according to claim 10, characterized in that a feed of feedstock (11) is provided for the respective pressing die (3) or a common feed (10) of feedstock (11) for two or more pressing dies (3) is provided, wherein, in case of a common feed (10) of feedstock (11), the respective pressing dies (3) are arranged side by side in a horizontal plane in the region of the feed (10) of feedstock (11) and/or of pre-pressing.

15. The arrangement according to claim 10, characterized in that the pre-pressing channel (7) has a tapered portion in the working direction.

16. The arrangement according to claim 10, characterized in that at least one pre-compactor (27) is arranged in the pre-pressing channel (7) or in the feed (11).

17. The arrangement according to claim 10, characterized in that the pre-compactor (27) is arranged at an angle of less than or equal to 90 degrees to the working direction of the pre-pressing punch (1).

* * * * *